(12) United States Patent
Unger et al.

(10) Patent No.: US 10,977,336 B2
(45) Date of Patent: Apr. 13, 2021

(54) SYSTEM AND METHOD OF PRE-PROCESSING DISCRETE DATASETS FOR USE IN MACHINE LEARNING

(71) Applicants: Andre J. Unger, Waterloo (CA); Robert William Enouy, Waterloo (CA)

(72) Inventors: Andre J. Unger, Waterloo (CA); Robert William Enouy, Waterloo (CA)

(*) Notice: Subject to any disclaimer, the term of this patent is extended or adjusted under 35 U.S.C. 154(b) by 230 days.

(21) Appl. No.: 16/272,442

(22) Filed: Feb. 11, 2019

(65) Prior Publication Data

US 2019/0377771 A1    Dec. 12, 2019

Related U.S. Application Data

(60) Provisional application No. 62/683,304, filed on Jun. 11, 2018.

(51) Int. Cl.
| | | |
|---|---|---|
| *G06F 17/14* | (2006.01) | |
| *G06F 17/18* | (2006.01) | |
| *G06N 20/00* | (2019.01) | |

(52) U.S. Cl.
CPC ............ *G06F 17/14* (2013.01); *G06F 17/18* (2013.01); *G06N 20/00* (2019.01)

(58) Field of Classification Search
CPC .......... G06F 17/14; G06F 17/18; G06N 20/00
USPC ...................................................... 707/756
See application file for complete search history.

(56) References Cited

U.S. PATENT DOCUMENTS

| | | | | |
|---|---|---|---|---|
| 8,438,126 | B2* | 5/2013 | van der Laan | G06F 17/18 706/46 |
| 10,037,305 | B2* | 7/2018 | Leonard | G06F 17/10 |
| 2007/0136115 | A1* | 6/2007 | Senturk Doganaksoy | G06Q 40/00 705/35 |
| 2008/0300702 | A1* | 12/2008 | Gomez | G06F 16/683 700/94 |

(Continued)

OTHER PUBLICATIONS

American Water Works Association (AWWA), 2012. Buried No Longer: Confronting America's Water Infrastructure Challenge. http://www.awwa.org/legislation-regulation/issues/infrastructure-financing.aspx. Accessed Feb. 26, 2015.

(Continued)

*Primary Examiner* — Shahid A Alam
(74) *Attorney, Agent, or Firm* — Bhole IP Law; Anil Bhole; Marc Lampert

(57) ABSTRACT

There is provided a system and method of pre-processing discrete datasets for use in machine learning. The method includes: determining a median and a standard deviation of an input discrete dataset; determining a probability mass function including a probability of finding a particular data point in the input discrete dataset within a particular bin of a histogram representative of the input discrete dataset; transforming the probability mass function into a continuously differentiable probability density function using the standard deviation, the probability density function determined using a parametric control function, the parametric control function including a lognormal derivative of the probability density function, the parameters within the control function are estimated using optimization that minimizes a mean-squared error of an objective function; and outputting the probability density function for use an input to a machine learning model.

20 Claims, 33 Drawing Sheets

(56) References Cited

U.S. PATENT DOCUMENTS

| | | | | |
|---|---|---|---|---|
| 2011/0078099 A1* | 3/2011 | Weston | ............... | G06K 9/6231 706/12 |
| 2011/0178905 A1* | 7/2011 | Kagarlis | ............... | G06Q 40/00 705/35 |
| 2012/0095892 A1* | 4/2012 | Kagarlis | ............ | G06Q 30/0201 705/35 |
| 2012/0209091 A1* | 8/2012 | Riback | ................... | G16H 40/63 600/309 |

OTHER PUBLICATIONS

Beecher, J. & Chestnutt, T., 2010. "The Conservation Conundrum: How Declining Demand Affects Water Utilities." Journal American Water Works Association 102 (2):78.
Beecher, J., 2012. Declining Water Sales and Utility Revenues: A Framework for Understanding and Adapting. National Water Rates Summer: White Paper. Racine, Wisconsin. Aug. 29-30, 2012.
Boland, J.J.; Ziegielewski, B.; Baumann, D.D.; and Optiz, E.M., 1984. Influence of Price and Rate Structures on Municipal and Industrial Water Use. US Corps of Engineers Institute for Water Resources, Fort Belvoir, Virginia 22060, Contract Report 84-C-2.
Bromiley, P. A., 2003. Products and Convolutions of Gaussian Probability Density Functions. Internal Memo—Tina Memo No. 2003-003. Last Updated 2014. Imaging Sciences Research Group, Institute of Population Health, School of Medicine, University of Manchester.
Brookeshire, D.S.; Burness, H.S.; Chermak, J.M.; and Krause, K., 2002. Western Urban Water Demand. Journal of Natural Resources, 42:873.
Sudicky, E., 1986. A natural gradient experiment on solute transport in a sand aquifer: Spatial variability of hydraulic conductivity and its role in the dispersion process. Water Resources Research, 22(13), 2069-2082, DOI: 10.1029/WR022i013p02069.
House-Peters, L. A. and Chang, H., 2011. Urban water demand modeling: Review of concepts, methods, and organizing principles. Water Resources Research, 47, 15.
Hutchinson, J., 2001. Culture, Communication, and an Information Age Madonna. IEEE Professional Communication Society Newsletter. May/Jun. 2001 vol. 45 No. 3.
Hyndman, R.J.; Bashtannyk, D.M.; and Grunwald, G.K., 1996. Estimating and Visualizing Conditional Densities. Journal of Computational and Graphical Statistics, vol. 5, No. 4 pp. 315-336.
Dalhuisen, J.M.; Florax, R.J.G.M; de Groot, H.L.F.M; and Nijkamp, P., 2003. Price and Income Elasticities of Residential Water Demand. Tinbergen Institute Discussion Paper, TI 2003-057/3.
Donkor, E.A.; Mazzuchi, T.A.; Soyer, R.; and Roberson, J.A., 2011. Urban Water Demand Forecasting: Review of Methods and Models. Journal of Water Resour. Plann. Manage., 2014, 140(2): 146-159.
J. Duda, 2017. Rapid parametric density estimation. arXiv:1702.02144v2 [cs.LG] Feb. 20, 2017.
Einstein, A., 1905. Investigations on the Theory of, the Brownian Movement (A. D. Cowper, Trans.). Dover Publications, Inc.
Zamborn and Dias 2012. A Review of Kernel Density Estimation with Applications to Econometrics. Universidade Estadual de Campinas. Dec. 2012.
Environmental Protection Agency (EPA), 2003. Water and Wastewater Pricing—An Informational Overview. Office of Wastewater Management. EPA 832-F-03-027.
EPA, 2005. Case Studies of Sustainable Water and Wastewater Pricing. Office of Water. EPA 816-R-05-007.
EPA, 2006. Expert Workshop on Full Cost Pricing of Water and Wastewater Service. Nov. 1-3, 2006. Michigan State University, Institute for Public Utilities. Office of Water. EPA 816-R-07-005.
Eskaf, S.; Hughes, J.; Tiger, M.; Bradshaw, K., & Leurig, S., 2014. Measuring & Mitigating Water Revenue Variability: Understanding How Pricing Can Advance Conservation Without Undermining Utilities' Revenue Goals. UNC Environmental Finance Center and Ceres.
Espey, M.; Espey, J.; & Shaw, W.D., 1997. Price Elasticity of Residential Demand for Water: A Meta-analysis. Water Resources Research, 33:6:1369.
Worthington, A.C. & Hoffman, M., 2008. An Empirical Survey of Residential Water Demand Modelling. Journal of Economic Survey, 22:5:842.
Stone, C., 1994. The Use of Polynomial Splines and Their Tensor Products in Multivariate Function Estimation. The Annals of Statistics, vol. 22, No. 1, pp. 118-171.
Hughes, J. A. and Leurig, S., 2013. Assessing Water System Revenue Risk: Considerations for Market Analysts. University of North Carolina—Environmental Finance Center and Ceres.
Hunter, M.; Donmoyer, K.; Chelius, J.; & Naumick, G., 2011. "Declining Water Use Presents Challenges, Opportunities." Journal of American Water Works Association. 37:5:18.
Loáiciga, H.A., 2009. Derivation approaches for the Theis equation. Groundwater, 47(4), 1-4.
Lohman, S.W., 1972. Ground-water hydraulics, U.S. Geological Survey Prof. Paper 708, 70p.
Olmstead, S.M.; Hanemann, W.M.; & Stavins, R.N., 2007. Water Demand Under Alternative Price Structures. Journal of Environmental Economics and Management, 54:2:181.
Mayer, P.; DeOreo, W.; Chesnutt T.; & Summers, L., 2008. Water Budgets and Rate Structures—Innovative Management Tools. Journal of American Water Works Association, 100:5:117.
Mehan III, T. & Kline, I., 2012. "Pricing as a Demand-Side Management Tool: Implications for Water Policy and Governance." Journal American Water Works Association, 104:2:61.
Narasimhan, T. N., 1999. Fourier's Heat Conduction Equation: History, Influence, and Connections. Reviews of Geophysics 37, Feb. 1999. pp. 151-172. American Geophysical Union. 8755-1209/99/1998RG900006515.
Region of Waterloo. Transportation and Environmental Services—Water Services. (2006a). Water Efficiency Master Plan Update 2007-2015. Available Online. http://www.regionofwaterloo.ca/en/aboutTheEnvironment/resources/water%20efficiency%20master%20plan.pdf.
Region of Waterloo—Department of Water Efficiency. Water Efficiency Master Plan 2015-2025. Available Online. http://www.regionofwaterloo.ca/en/aboutTheEnvironment/resources/WEMP_2015_-_2025_FINAL_May_1_2025.pdf.
Rehan, R.; Knight, M.A.; Haas, C.T.; & Unger, A.J.A., 2011. Application of System Dynamics for Developing Financially Self-Sustaining Management Policies for Water and Wastewater Systems. Water Research, 45:16:4737.
Rehan, R.; Knight, M.A.; Unger, A.J.A.; & Haas, C.T., 2013. Development of a System Dynamics Model for Financially Sustainable Management of Municipal Watermain Networks. Water Research, 47:20:7184.
Rehan, R.; Knight, M.A.; Unger, A.J.A.; & Haas, C.T., 2014a. Financially Sustainable Management Strategies for Urban Wastewater Collection Infrastructure—Development of a System Dynamics Model. Tunnelling and Underground Space Technology, 39:116.
Rehan, R.; Unger, A.J.A.; Knight, M.A.; & Haas, C.T., 2014b. Financially Sustainable Management Strategies for Urban Wastewater Collection Infrastructure—Implementation of a System Dynamics Model. Tunnelling and Underground Space Technology, 39:102.
Rehan, R.; Unger, A.J.A; Knight, M.A.; & Haas, C.T., 2014c. Strategic Water Utility Management and Financial Planning Using a New System Dynamics Tool. Journal of American Water Works Association, 107:1.
Stahl, S., 2006. The evolution of the normal distribution. Mathematics Magazine.79(2), 96-113.

* cited by examiner

SYSTEM AND METHOD OF PRE-PROCESSING DISCRETE DATASETS FOR USE IN MACHINE LEARNING

TECHNICAL FIELD

The present invention relates generally to the field of data processing; and more particularly, to systems and methods of pre-processing discrete datasets for use in machine learning.

BACKGROUND

More and more commonly, machine learning forecasting techniques are being used to analyze and provide forecasts on large input datasets, for example; large discrete datasets. Often, the distribution of these large discrete datasets can be organized and aggregated into discrete bins to produce histograms. In some cases, using machine learning techniques to analyze large sets of discrete data aggregated into histograms can create a challenge, for example, when attempting to compress a histogram for a given large dataset due to, for example, data processing requirements.

SUMMARY

In an aspect, there is provided a method of pre-processing discrete datasets for use in machine learning, the method executable on one or more computer processors, the method comprising: receiving an input discrete dataset; determining a median and a standard deviation of the input discrete dataset; generating a probability mass function comprising a probability of finding a particular data point in the input discrete dataset within a particular bin of a histogram representative of the input discrete dataset; transforming the probability mass function into a continuously differentiable probability density function using the standard deviation, the probability density function determined using a parametric control function, the parametric control function comprising a lognormal derivative of the probability density function, the parameters within the control function are estimated using optimization that minimizes a mean-squared error of an objective function; and outputting the probability density function for use an input to a machine learning model.

In a particular case, the method further comprising discarding any data point greater than a predetermined culling threshold.

In another case, the input discrete dataset comprising a unimodal distribution and the parametric control function comprising a linear function.

In yet another case, the parametric control function further comprising at least one of polynomial terms and Fourier terms.

In yet another case, the input discrete dataset comprising a multi-modal distribution and the parametric control function comprising a parameterized modified Fourier series.

In yet another case, the method further comprising: transforming the input discrete dataset into a median relative space; determining a cumulative mass function as a summation over bins of the probability mass function; mapping the cumulative mass function to the median relative space; determining a cumulative distribution function as an integration of the probability density function; and mapping the cumulative distribution function into the median-relative space, wherein the minimizing mean-squared error of the objective function comprising minimizing a mean-squared error between the cumulative distribution function and the cumulative mass function in the median-relative space.

In yet another case, the transforming of the input discrete dataset into the median relative space comprising a linear transformation.

In yet another case, the transforming of the input discrete dataset into the median relative space comprising a lognormal transformation.

In yet another case, the method further comprising determining a goodness of fit of the parametric probability density function comprising minimizing a mean-squared error between an arithmetic mean of the input discrete dataset in the median-relative space and a mean of the probability density function in the median-relative space.

In yet another case, the method further comprising adding additional polynomial terms to the objective function incrementally until the mean-squared error between the cumulative distribution function and the cumulative mass function in the median-relative space is minimized.

In another aspect, there is provided a system of pre-processing discrete datasets for use in machine learning, the system comprising one or more processors and one or more non-transitory computer storage media, the one or more non-transitory computer storage media causing the one or more processors to execute: an input module to receive an input discrete dataset; a compression module to: determine a median and a standard deviation of the input discrete dataset; determine a probability mass function comprising a probability of finding a particular data point in the input discrete dataset within a particular bin of a histogram representative of the input discrete dataset; and transform the probability mass function into a continuously differentiable probability density function using the standard deviation, the probability density function determined using a parametric control function, transforming the probability mass function into a continuously differentiable probability density function using the standard deviation, the probability density function determined using a parametric control function, the parametric control function comprising a lognormal derivative of the probability density function, the parameters within the control function are estimated using optimization that minimizes a mean-squared error of an objective function, the parameters within the control function are estimated using optimization that minimizes a mean-squared error; and an output module to output the probability density function for use an input to a machine learning model.

In a particular case, the compression module further discarding any data point greater than a predetermined culling threshold.

In another case, the input discrete dataset comprising a unimodal distribution and the parametric control function comprising a linear function.

In yet another case, the parametric control function further comprising at least one of polynomial terms and Fourier terms.

In yet another case, the input discrete dataset comprising a multi-modal distribution and the parametric control function comprising a parameterized modified Fourier series.

In yet another case, the compression module further: transforming the input discrete dataset into a median relative space; determining a cumulative mass function as a summation over bins of the probability mass function; mapping the cumulative mass function to the median relative space; determining a cumulative distribution function as an integration of the probability density function; and mapping the cumulative distribution function into the median-relative space, wherein the minimizing mean-squared error of the objective function comprising minimizing a mean-squared error between the cumulative distribution function and the cumulative mass function in the median-relative space.

In yet another case, the transforming of the input discrete dataset into the median relative space comprising using a linear transformation.

In yet another case, the transforming of the input discrete dataset into the median relative space comprising using a lognormal transformation.

In yet another case, the compression module further determining a goodness of fit of the parametric probability density function comprising minimizing a mean-squared error between an arithmetic mean of the input discrete dataset in the median-relative space and a mean of the probability density function in the median-relative space.

In yet another case, the compression module further adding additional polynomial terms to the objective function incrementally until the mean-squared error between the cumulative distribution function and the cumulative mass function in the median-relative space is minimized.

These and other aspects are contemplated and described herein. It will be appreciated that the foregoing summary sets out representative aspects of a system and method for training a residual neural network and assists skilled readers in understanding the following detailed description.

DESCRIPTION OF THE DRAWINGS

A greater understanding of the embodiments will be had with reference to the Figures, in which.

DETAILED DESCRIPTION

Figure 1:
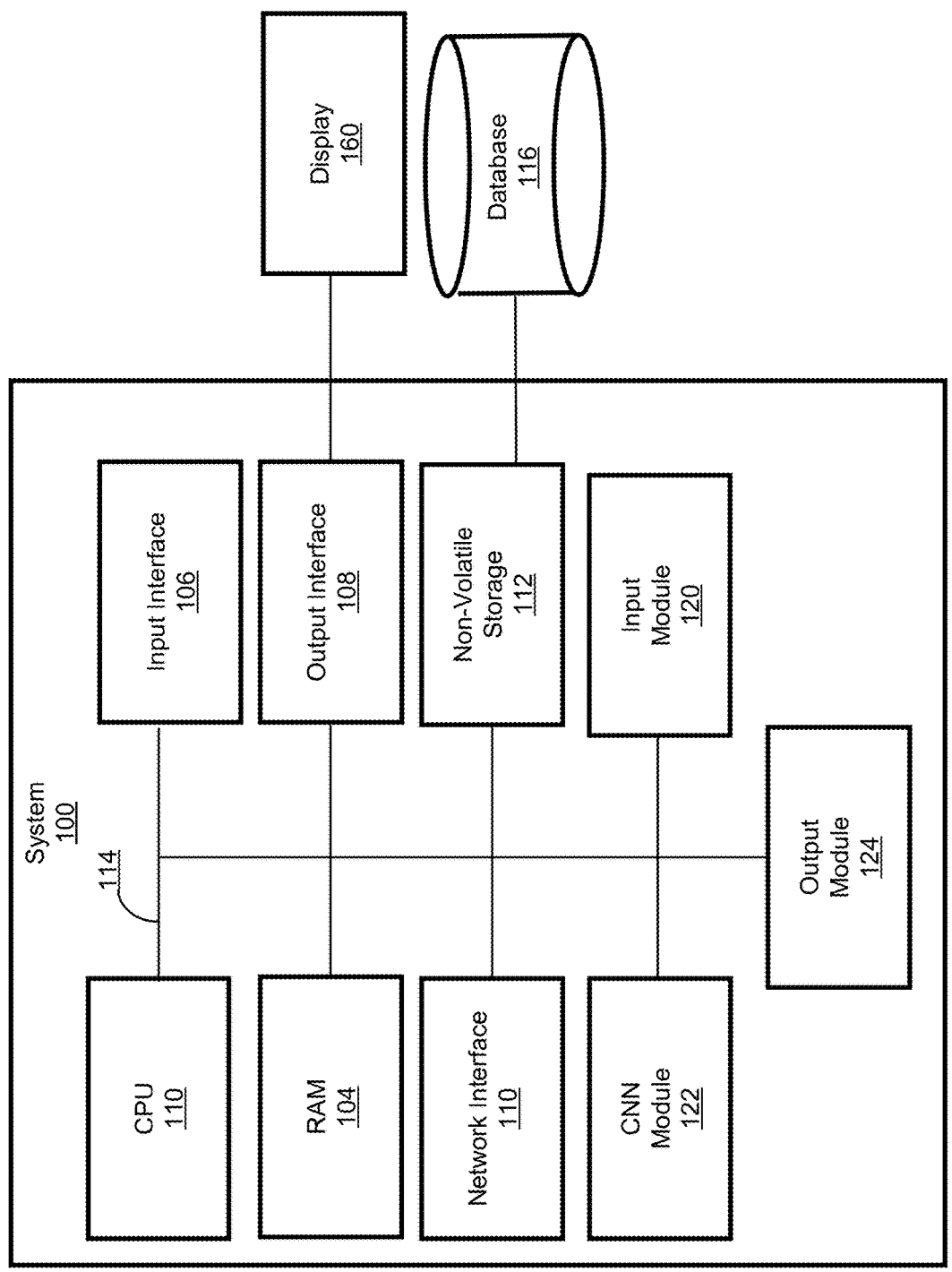
FIG. 1 is a schematic diagram of a system for pre-processing discrete datasets for use in machine learning, in accordance with an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

As described above, using machine learning techniques to analyze large sets of discrete data aggregated into histograms creates a challenge, particularly when attempting to analyze how a histogram may respond to an extraneous process for forecasting purposes. Some approaches have oversimplified the problem by making assumptions regarding the functional form of a probability density function (PDF) that best fits the histograms and the relationship between parameters defining the PDF to extraneous processes. This approach can result in vague and inaccurate forecasting results. Other approaches have applied an inconstant parameterization of the PDF to replicate how the histogram changes its location, scale and shape through time. This approach can further complicate the procedure of attributing casual influences for the purpose of forecasting the system response.

The present embodiments provide systems and methods of pre-processing discrete datasets for use in machine learning.

As a non-limiting exemplary summary, the present embodiments provide an approach comprising:
evaluating a median $m_{x,i}$ and a standard deviation $\sigma_{x,i}$ of an inputted discrete dataset $x_i$;
transforming the discrete data $x_i$ into a median relative space, for example, using one of:
a linear transformation where $$y_i = \frac{x_i}{m_{x,i}};$$

or
a lognormal transformation where $$y_i = \ln\frac{x_i}{m_{x,i}};$$

creating discrete bins k within a culled version of the dataset $x_i$ to generate histograms $h_{x_{k-1} < x_i < x_k}$ and the probability of occurrence $p_{x,k}$ within each bin;

transforming a probability mass function (PMF) $p_{x,k}$ into a cumulative mass function (CMF) $c_{x,k_1}$ and then map it into the median-relative space, $c_{x,k_1} \rightarrow c_{y,k_1}$;
selecting an appropriate control function to generate a cumulative distribution function (CDF) $c_z$ and then map $c_z \rightarrow c_y$; and
incrementally add terms to a control function $g_z$ extension and use an optimization strategy that adjusts parameters within the control function $g_z$ by minimizing an objective function such that $c_{y,k_1} \cong c_y$.

In some cases, the above approach can further include evaluating the appropriateness of the control function by comparing the arithmetic mean $\mu_{y,i}$ to the mean statistic $\mu_y$ in the median-relative space.

In some cases, the above approach also includes, after transformation, determining where culling is necessary by assessing the contribution and relevance of data points $y_i$ that exceed a predefined threshold $y_{max}$. This threshold may be adjusted to balance the need to both minimize the amount of culled data, and also minimize the distortion of large magnitude outliers on $m_{x,i}$ and $\sigma_{x,i}$.

In some cases, the above approach also includes, in the case that culling is necessary, finalizing the standard deviation $\sigma_{x,i}$ and arithmetic mean $\mu_{x,i}$ of the culled data.

In an example, input datasets comprising individual measurements obtained within a discrete sampling interval can define a range of system conditions. For example, such measurements can be non-zero and real-valued observations and can be subject to measurement error. In an example embodiment, the system can evaluate an ordered frequency of these measurements to construct a histogram. Dividing the frequency at which measurements occur within a discrete sampling interval by the total number of measurements can be used to transform the histogram into a probability mass function (PMF). The probability of observing a measurement within a range of discrete intervals can be determined using a summation, which results in a corresponding cumulative mass function (CMF). An advantage of using parametric probability density functions (PDFs) is that they can provide an empirical mechanism to characterize defining attributes of the discrete input datasets. For example, these attributes can include location, scale, and shape of the histogram; which the system can be used to translate these attributes into statistics that combine to accurately express PMFs as continuous PDFs.

The present embodiments advantageously provide an approach that can produce histogram data in a way that is asymmetric, shifted, tail-weighted, and/or multi-modal as parametric PDFs.

Figure 2:
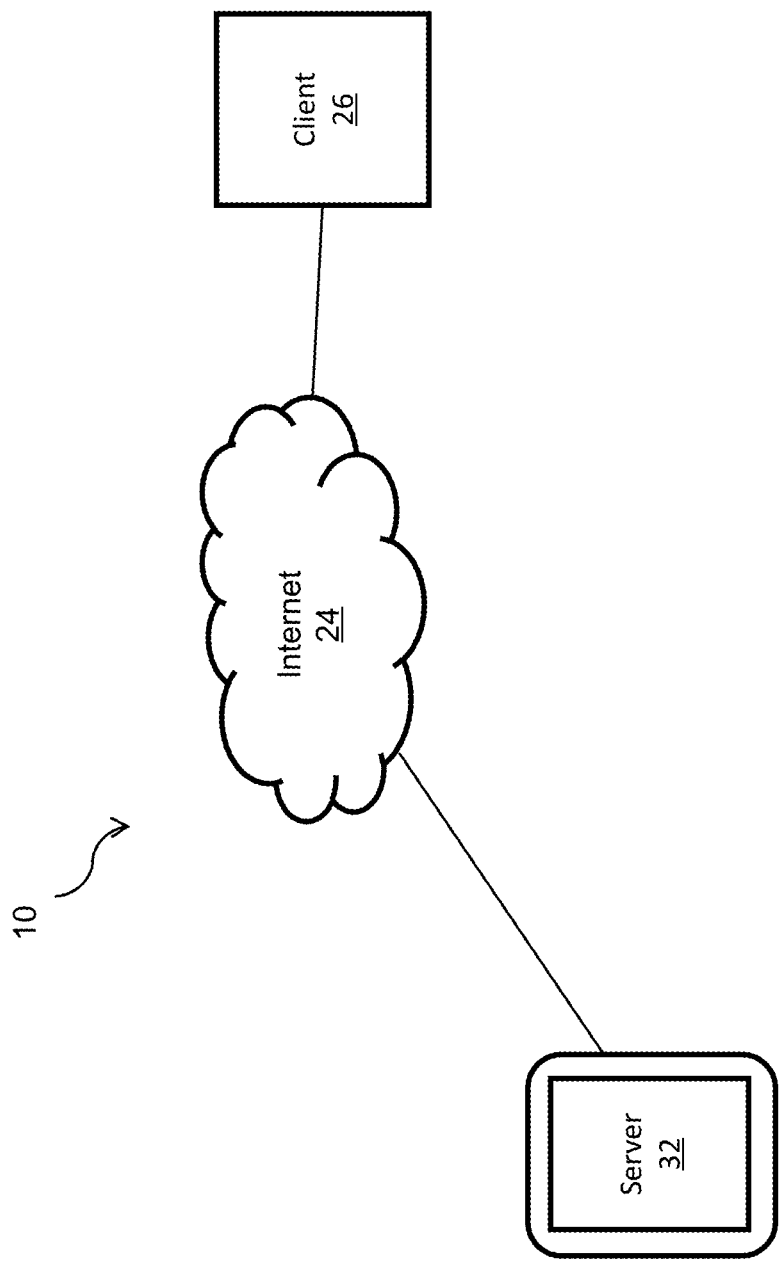
FIG. 2 is a schematic diagram showing the system of FIG. 1 and an exemplary operating environment.

Referring now to FIG. 1 and FIG. 2, a system 100 of pre-processing discrete datasets for use in machine learning, in accordance with an embodiment, is shown. In this embodiment, the system 100 is run on a client side device 26 and accesses content located on a server 32 over a network 24, such as the internet. In further embodiments, the system 100 can be run on any other computing device; for example, a desktop computer, a laptop computer, a smartphone, a tablet computer, a server, a smartwatch, distributed or cloud computing device(s), or the like.

In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a central processing unit ("CPU") 102 (comprising one or more processors), random access memory ("RAM") 104, an input interface 106, an output interface 108, a network interface 110, non-volatile storage 112, and a local bus 114 enabling CPU 102 to communicate with the other components. CPU 102 executes an operating system, and various modules, as described below in greater detail. RAM 104 provides relatively responsive volatile storage to CPU 102. The input interface 106 enables an administrator or user to provide input via an input device, for example a keyboard and mouse. In other cases, the image data can be already located on the database 116 or received via the network interface 110. The output interface 108 outputs information to output devices, for example, a display 160 and/or speakers. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution.

In an embodiment, the CPU 102 is configurable to execute an input module 120, a compression module 122, and an output module 124. As described herein, the compression module 122 is able to pre-process a discrete input dataset by way of compressed representation of a continuously differentiable probability density function.

Histograms, for example those shown in FIGS. 4 to 7, comprise datasets that contain a number of measurements denoted as $x_i$ (for example, hundreds or thousands of measurements). Generally, the measurements can be binned and aggregated into a histogram, where these histograms can vary in complexity from unimodal to multi-modal distributions. Discrete intervals on each histogram generally represent a probability of occurrence within a PMF when a histogram frequency is divided by a total number of measurements $N_i$. Equation (1) below defines discrete intervals within a histogram and illustrates the manner by which these discrete bins relate to a PMF and a CMF.

$$h_{x_{k-1} < x_i < x_k} \equiv \text{frequency within histogram bin} \quad (1)$$

$$p_{x,k} = \frac{h_{x_{k-1} < x_i < x_k}}{N_i}, \quad 0 \leq p_{x,k}$$

$$c_{x,k_1} = \sum_{k=1}^{k_1} p_{x,k}, \quad 0 \leq c_{x,k_1} \leq 1,$$

where $h_{x,k}$ represents the frequency of measurement values $x_i$ within a discrete sampling interval $x_{k-1} < x_i < x_k$. The PMF $p_{x,k}$ divides each histogram bin by the number of observations $N_i$. The CMF $c_{x,k_1}$ follows by summing over the bins from $k=1 \rightarrow k_1$. For illustration, examples of PMF representations for datasets are shown in FIGS. 8 to 11. These illustrations also include an illustration of a determination of a parametric PDF according to the embodiments described herein. Advantageously, the determined parametric PDFs accurately reproduce each dataset as a continuously differentiable function that implies data compression.

Advantageously, the parametric control function described in the present embodiments can generate continuously differentiable PDFs in the standard-score space. The control function can embody parametrization that replicates the shape of the PMF and CMF; and, hence the probability of occurrence within any interval on the histogram. The relationship between the control function and PDF can be specified by an ordinary differential equation (ODE), where the control function is the lognormal derivative of a PDF with respect to a standard-score variable z. In this way, this relationship can be used to determine how a shape of the distribution changes along a standard-score axis. The system 100 can thus use the control function to define a shape attribute and provide a mechanism to produce discrete datasets as continuous functions. In this way, the median and standard deviation can be used to project the standard-score z PDF into measurement x and median-relative y spatial orientations. Together, the system 100 can use the median, standard deviation, and control function to provide sufficient information to specify a hierarchical relationship between the control function, PDF, and CDF simultaneously, for example, in all spatial orientations; x, y and z.

The median is a statistic associated with a discrete dataset, and measures its location or central tendency. In this case, the median provides a frame of reference for evaluating the scale and shape of the distribution. As such, the present embodiments are a departure from other approaches that use standard deviation, which characterizes the scale of a dataset. Variance is often deemed to be a sum of squares departure from the mean statistic, which also defines the standard deviation with respect to the mean statistic. In various present embodiments, the variance and standard deviation are determined relative to the median statistic, which is consistent with symmetric distributions. As described herein, this approach for the standard deviation provides a theoretical basis for evaluating the mean statistic of any PDF as a function of the median, standard deviation, and control function. Regarding control function parameterization, the present embodiments illustrate using a difference between empirical and parametric evaluation of the mean statistic to characterize the goodness of fit for describing each discrete dataset as a continuous PDF for use in a machine learning model.

In some embodiments, the system 100 applies a median statistic to normalize discrete input data values from a measurement space $x_i$ into an equivalent but dimensionless median-relative space $y_i$. A challenge in the input dataset to many machine learning models is that some measurement data $x_i$ may not contribute to continuum conditions of the system 100 and may reflect population outliers to the dataset. Advantageously, the present embodiments make use of the median statistic, which is insensitive to low frequency and high magnitude outliers. In contrast, these outliers disproportionately influence the standard deviation statistic. For this reason, some embodiments apply data culling in the median-relative space because it provides a stable environment for removing population outliers without recursively shifting the median statistic as a measure of the location of the PDF. The system 100 can use the median-relative space because it exists independent of the standard deviation and provides a convenient frame of reference to specify an objective function supporting parameterization of the control function; and it provides a general solution that applies to even the most disparate datasets, for example, as shown in FIGS. 4 to 7. Further, embodiments of the system 100 use the median-relative space because it provides a constant frame of reference for evaluating a scale and shape of a distribution and allows the mean statistic to be used as part of a solution to an advection-dispersion problem.

Advantageously, the embodiments described herein enable pre-processing of discrete datasets by offering efficient parametric compression of the discrete datasets without assuming a predefined distribution shape. This approach can ultimately reduce the possibility of information loss associated with other approaches that describe non-Gaussian datasets, while simultaneously reducing the storage needs to maintain data fidelity. As described herein, a degrees of freedom analysis was used to empirically show that the embodiments described herein are able to efficiently compress the input dataset; for example, information from the four disparate histograms in FIGS. 4 to 7 by a minimum of 98%.

Figure 3:
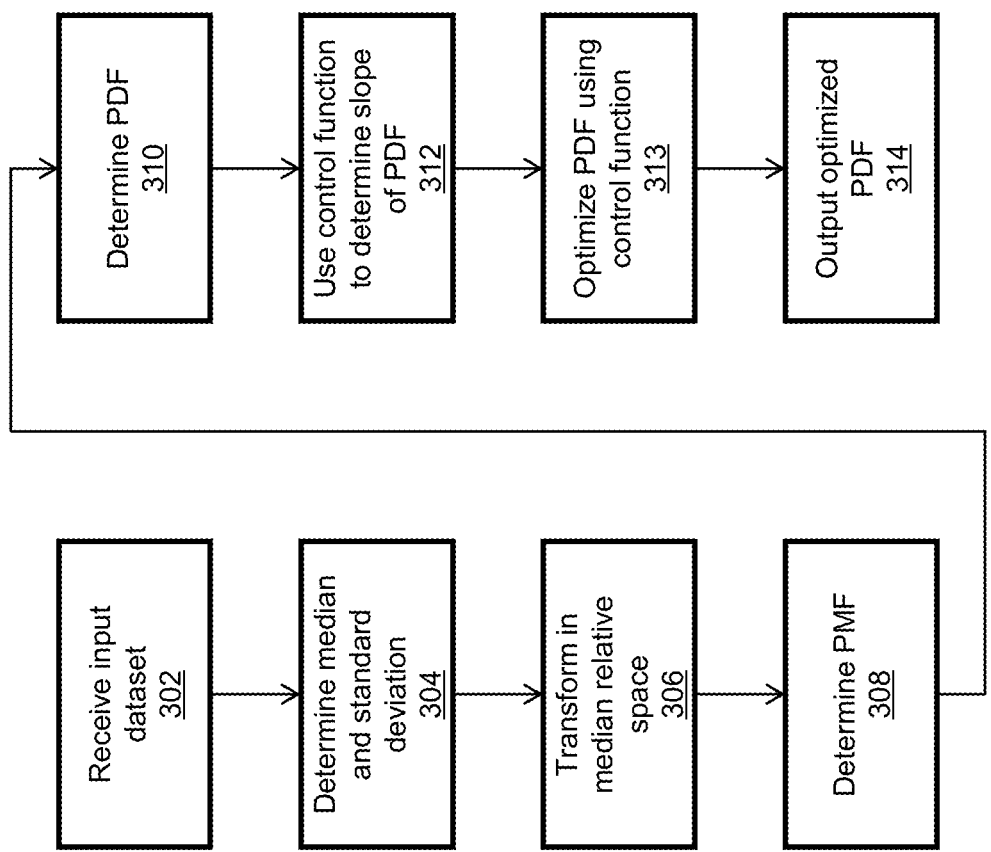
FIG. 3 is a flow chart of a method for pre-processing discrete datasets for use in machine learning, in accordance with an embodiment.

Turning to FIG. 3, shown is a flowchart for a method of pre-processing discrete datasets for use in machine learning, in accordance with an embodiment.

At block 302, an input module 120 receives an input discrete dataset.

At block 304, a compression module 122 determines a median and a standard deviation of the input discrete dataset.

At block 306, the compression module 122 transforms the discrete input dataset into a median relative space using a ratio of the data and the median.

At block 308, the compression module 122 determines a probability mass function as the probability of finding a particular data point in the dataset within a $k^{th}$ bin of a histogram of the input discrete dataset.

At block 310, the compression module 122 transforms the probability mass function into a continuously differentiable probability density function using the standard deviation.

At block 310, the compression module 122 uses a parametric control function to determine a slope of the continuously differentiable probability density function in a standard-score space, the control function being the lognormal derivative of the probability density function.

At block 312, the compression module 122 optimizes the parametric control function by estimating parameters of the parametric control function using a minimization of a mean-squared error.

At block 314, the output module 124 outputs the PDF for use an input to a machine learning model.

Embodiments of the system 100 apply pre-processing by, at least, reproducing discrete histogram data as a continuously differentiable parametric PDF. A control function is introduced that characterizes a slope of a continuously differentiable PDF in a standard-score space. In most cases, PDFs are defined by their representative statistics: the median, standard deviation, and control function, which are measures of location, scale, and shape, respectively. A hierarchical integral relationship between the control function, PDF, and CDF is used by the system 100 to compress the information embodied by the input discrete histogram data into 8 minimal sets of information. In most cases, the mean value is dependent upon the combination of the median, standard deviation, and control function, which allows the system 100 to determine causative models that do not rely upon Gaussian distributions.

The median is a measure of an input discrete dataset's location or central tendency with no assumption regarding its shape. Equation (2) introduces a heuristic for the system 100 to evaluate the median $m_{x,i}$ of a discrete dataset as:

$$m_{x,i} = \left\{\frac{N_i + 1}{2}\right\}^{th} \text{value} \quad (2)$$

where, $N_i$ is the number of discrete measurements "i" within the dataset. If a dataset has an even number of discrete measurements, the median will be the average of the two middle data points.

The standard deviation defines an input discrete dataset's scale, also with no assumption about its shape. Equation (3) presents a modified version of the standard deviation $\sigma_{x,i}$ of a discrete dataset about its median value $m_{x,i}$ to be evaluated by the system 100 as:

$$\sigma_{x,i} = \sqrt{\frac{1}{(N_i - 1)}\sum_{i=1}^{N_i}[x_i - m_{x,i}]^2} \quad (3)$$

where, $x_i$ is the magnitude of measurement "i" obtained in the measurement and dimensional x space. The system 100 uses the above modification of the standard deviation being relative to the median given that both $m_{x,i}$ and $u_{x,i}$ operate on the discrete elements of the input discrete dataset $x_i$, while $\mu_{x,i}$ is the arithmetic mean and measures a scalar continuum condition of the discrete dataset $x_i$. As described herein, the mean statistic for the purposes of the system 100 is a function of the median, standard deviation, and control function. In this way, the system's 100 evaluation of the standard deviation as a function of the median prevents a recursive relationship between the standard deviation and mean value for asymmetric input datasets.

As described herein, the median and standard deviation can be used to transform PMFs and PDFs between the measurement space x and standard-score space z. The system 100 also uses another transformation, herein referred to as the median-relative space y, which normalizes PMFs and PDFs by dividing each measurement/position by the median statistic to produce a dimensionless dataset. While both y and z spaces are non-dimensional representations of x, they have different implications in relating PMFs to PDFs. As described below, there are beneficial implications and merits of defining the shape of the PDF in the standard-score space through the control function.

As described above, a PMF interval $p_{x,k}$ can be used to represent the probability of finding a discrete measurement $x_i$ within a $k^{th}$ bin of a histogram of the input discrete dataset. The system 100 can transform PMFs $p_{x,k}$ into continuously differentiable PDFs $p_x$ over the full range of the measurement space. Firstly, this equivalence can be expressed in the standard-score space as $p_{z,k}$ which involves multiplication of $p_{x,k}$ by $\sigma_{x,i}$: $p_{z,k}=\sigma_{x,i}p_{x,k}$. Evaluating the equivalence between the PMF and PDF $p_{z,k} \cong p_z$ in the standard-score space z is advantageous because its central-tendency is zero and it is therefore conducive to reproducing symmetry; for example, the normal distribution. Advantageously, the standard-score space has been determined to be an appropriate spatial reference for parametrizing the control function and the resulting PDF.

A parametric control function $g_z$ is used to determine the slope of the PDF $p_z$ in the standard-score space z. The control function is an ODE that is consistent with the derivative of Gauss' maximum likelihood estimator for the error process and Stahl's derivation of the normal distribution. Equation (4) illustrates hierarchical and probabilistic relationships between the control function, PDF, and their corresponding CDF $c_z$:

$$\frac{dp_z}{dz} = g_z p_z \Longrightarrow p_z = \exp\left(\int g_z dz\right) \Longrightarrow c_z = \int_{z_0}^{z_1} p_z dz \qquad (4)$$

where, the integration is defined on the interval of $z_0 \leq z \leq z_1$, and $z_0$ represents the standard-score position pertaining to the origin of the discrete data in the measurement space $x_0$. The relationship between control function $g_z$, PDF $p_z$ and CDF $c_z$ projects into the measurement space yielding their measurement space equivalent PDF $p_x$ and CDF $c_x$ using the standard deviation $\sigma_{x,i}$. As such, the location, scale, and shape of PDFs are generally represented by the median, standard deviation, and control function, respectively.

The system 100 can use the median and standard deviation statistics to transform PDFs between the measurement space x, the median relative space y, and the standard-score space z. The CDF is generally identical in each spatial representation, which ensures conservation of probability of occurrence for all spatial representations as:

$$\int p_x^* dx = \int p_y^* dy = \int p_z dz \qquad (5)$$

where $p_x^*$, $p_y^*$, and $p_z$ represent the zero-centered PDFs in the measurement, median-relative, and standard-score spatial representations, respectively. The * superscript denotes centering the distribution at zero by subtracting the associated median value as, $p_x^* = p_x - m_x$ for each spatial representation. The system 100 can use Equation (5) to ensure that a hierarchal relationship between control function $g_z$, PDF $p_z$ and CDF $c_z$ in the standard-score space consistently projects into the measurement space and/or median-relative space. Thus, while the control function only mathematically exists in the standard-score space, the projection of the resulting PDF $p_z$ simultaneously defines the probability of occurrence in all spatial representations.

Table 1 illustrates the transformations that can be conducted by the system 100 for continuous zero-centered PDFs between each spatial representation. Transformations of the discrete input data can be accomplished using the median and standard deviation statistics and denoted in the "Magnitude" column of Table 1 where, $x_i$, $y_i$, and $z_i$ represent the discrete data measurements in their respective spatial representations. The "PDF" and "derivative" columns introduce variable transformations that ensure conservation of probability within the CDFs in each spatial representation.

Table 2 illustrates a lower bound, a central-tendency, and an upper bound for parametric PDFs in each spatial representation. It should be noted that the probability of occurrence between the lower, central, and upper bounds within each spatial representation is retained. In most cases, there is generally a 50-percent chance that input data exists between the lower bound and central tendency, $$\int_0^{m_x} p_x dx = \int_0^1 p_y dy = \int_{-\frac{m_{x,i}}{\sigma_{x,i}}}^0 p_z dz = \frac{1}{2};$$

and there is generally a 100-percent chance that input data exists between the lower and upper bounds. In most cases, the lower bound of the standard-score space is dependent upon the median and standard deviation statistics and the central tendency of the measurement space is dependent upon the median. Therefore, if the system 100 were to evaluate the distribution solely in the standard-score space and project it into the measurement space, it could introduce measurement bias for processes where the median and standard deviation change with respect to time. These biases could result, for example, from the need to cull outlier values of $x_i$, with the process strongly influencing $\sigma_{x,i}$. As described herein, the median $m_{x,i}$ is insensitive to this culling process. Thus, the system 100 can use the median-relative space to evaluate a time-sequence of CDFs using their respective median, and not having to use their standard deviation values; which can alleviate any concern about biasing their location as part of the data culling process, and hence the relationship between time sequential PDFs. The median-relative space provides a stable region in which to estimate the parameters of the control function, and then project the resulting PDF into the measurement space and standard-score space. Using this spatial representation to evaluate all aspects of a PDF, including the mean statistic, allows the system 100 to change the median and standard deviation without recursively influencing interpretation of the PDF.

TABLE 2

Data boundaries in each spatial representation.

| | $x_i$ | $y_i$ | $z_i$ |
|---|---|---|---|
| Lower Bound | $x_0 = 0$ | $y_0 = 0$ | $z_0 = -\frac{m_{x,i}}{\sigma_{x,i}}$ |
| Central Tendency | $m_x$ | $m_y = 1$ | $m_z = 0$ |
| Upper Bound | $x_{max} = \infty$ | $y_{max} = \infty$ | $z_{max} = \infty$ |

TABLE 1

Data transformations.

| Space | Magnitude | PDF | Derivative |
|---|---|---|---|
| x | $x_i$ | $p_x^* = \frac{1}{m_{x,i}} p_y^* = \frac{1}{\sigma_{x,i}} p_z$ | $dx = m_{x,i} dy = \sigma_{x,i} dz$ |
| y | $y_i = \frac{x_i}{m_{x,i}} = \frac{\sigma_{x,i}}{m_{x,i}} z_i + 1$ | $p_y^* = \frac{m_{x,i}}{\sigma_{x,i}} p_z = m_{x,i} p_x^*$ | $dy = \frac{\sigma_{x,i}}{m_{x,i}} dz = \frac{1}{m_{x,i}} dx$ |
| z | $z_i = \frac{y_i - 1}{\frac{\sigma_{x,i}}{m_{x,i}}} = \frac{x_i - m_{x,i}}{\sigma_{x,i}}$ | $p_z$ | $dz = \frac{m_{x,i}}{\sigma_{x,i}} dy = \frac{1}{\sigma_{x,i}} dx$ |

As illustrated in Equation (4), the system 100 can use the control function as the lognormal derivative of a continuous PDF. The nature of the control function can define the shape, or relative frequency, of the PDF in the standard-score space. Generally, there exists specific conditions where the control function can enforce the PDF to converge to a finite area on an unbounded interval; where that area can be scaled to unity. Specifically, the control function has to: 1) approach positive infinity as 'z' approaches negative infinity, $g_z \to +\infty$ as $z \to -\infty$; and, 2) approach negative infinity as 'z' approaches positive infinity, $g_z \to -\infty$ as $z \to +\infty$.

The system 100 can use the control function as a parametric representation that has the freedom and flexibility to match the shape of many discrete input datasets. As described above, the system 100 can express the discrete input data as PMFs in the measurement space, with the median and standard deviation progressively transforming the PMFs into the median-relative space y and standard-score space z. The control function embodies information related to the probability of occurrence on bounded intervals in the measurement space x. As described herein, the control function can have a parametric nature and the system 100 can parametrize it, for example, starting with a normal distribution.

The system 100 can use a linear control function $g_z$, as illustrated in Equation (6), to determine a normal distribution for a specific parameterization:

$$g_z = -[\alpha_1 + \alpha_2 z] \qquad (6)$$
$$p_z = \exp\left(-\left[\alpha_0 + \alpha_1 z + \frac{\alpha_2}{2} z^2\right]\right)$$

where $\alpha_0$ is a constant of integration, and $\alpha_1$ and $\alpha_2$ represent control function parameters. Note that the control function and PDF are essentially polynomial series with respect to the standard-score variable z. Moreover, the control function in Equation (6) has a negative slope given by $-\alpha_2$ with intercept $-\alpha_1$. Therefore, this relationship has the properties of $g_z \to +\infty$ as $z \to -\infty$ and $g_z \to -\infty$ as $z \to +\infty$ to enforce convergence to unit area. Generally, setting the control function parameters to be $\alpha_1=0$ and $\alpha_2=1$ produces a normal distribution, which relegates the constant of integration to be $\alpha_0 = -\ln|\sqrt{1/2\pi}|$. Table 3 illustrates the control function parametrization for the normal distribution and provides a definition of $p_z$ from Equation (6).

TABLE 3

Parametrization of the normal distribution and $\alpha_2$ family of curves.

| Other Approaches (Polar Coordinates) | General Parametric Solution |
|---|---|
| $\alpha_0 = -\ln\left\|\sqrt{\dfrac{1}{2\pi}}\right\|$ | $\alpha_0 = -\ln\left\|\sqrt{\dfrac{\alpha_2}{2\pi}}\right\|$ |
| $\alpha_1 = 0$ | $\alpha_1 = 0$ |
| $\alpha_2 = 1$ | $0 < \alpha_2 < \infty$ |
| $p_z = \exp\left(\ln\left\|\sqrt{\dfrac{1}{2\pi}}\right\|\right)\exp\left(-\dfrac{1}{2}z^2\right)$, the normal distribution | |

The system 100 can use the control function parameter $\alpha_1$ in Equation (6) to shift the PDF along the z-axis while maintaining unit area. Advantageously, the general form of the linear control function $g_z = -\alpha_1 - \alpha_2 z$ can provide useful properties for fitting the shape of the histograms. In these embodiments, this root polynomial can serve as a basis for generating PDFs reminiscent of the normal distribution, but with shape attributes that more accurately reflect measurement data.

In the present embodiments, the shape of the PDF in the standard-score space can be governed by a linear control function with a vertical intercept of zero given by $\alpha_1=0$, but with $0<\alpha_2<\infty$. Using a change of variable, a tangent function transforms the $\alpha_2$ parameter into an angular slope measured in degrees. The $\alpha_2$ parameter allows the control function to generate a PDF with unit area; thus, the influence of this parameter on the resulting shape of the PDF is referred to herein as the "$\alpha_2$ family of curves." The system 100 can use Equation (7) as a root polynomial control function for the $\alpha_2$ family of curves:

$$g_z = -\left[\alpha_1 + \tan\left(\frac{\alpha_2 \pi}{180}\right)z\right] \qquad (7)$$
$$p_z = \exp\left(-\left[\alpha_0 + \alpha_1 z + \frac{1}{2}\tan\left(\frac{\alpha_2 \pi}{180}\right)z^2\right]\right)$$

In this case, for the purposes of illustration, degrees are used instead of radians because it is more intuitive, and because converting the slope into a measure of degrees constrains $\alpha_2$ to exist between $0°<\alpha_2<90°$; whereas radians are unbounded.

Figure 12:
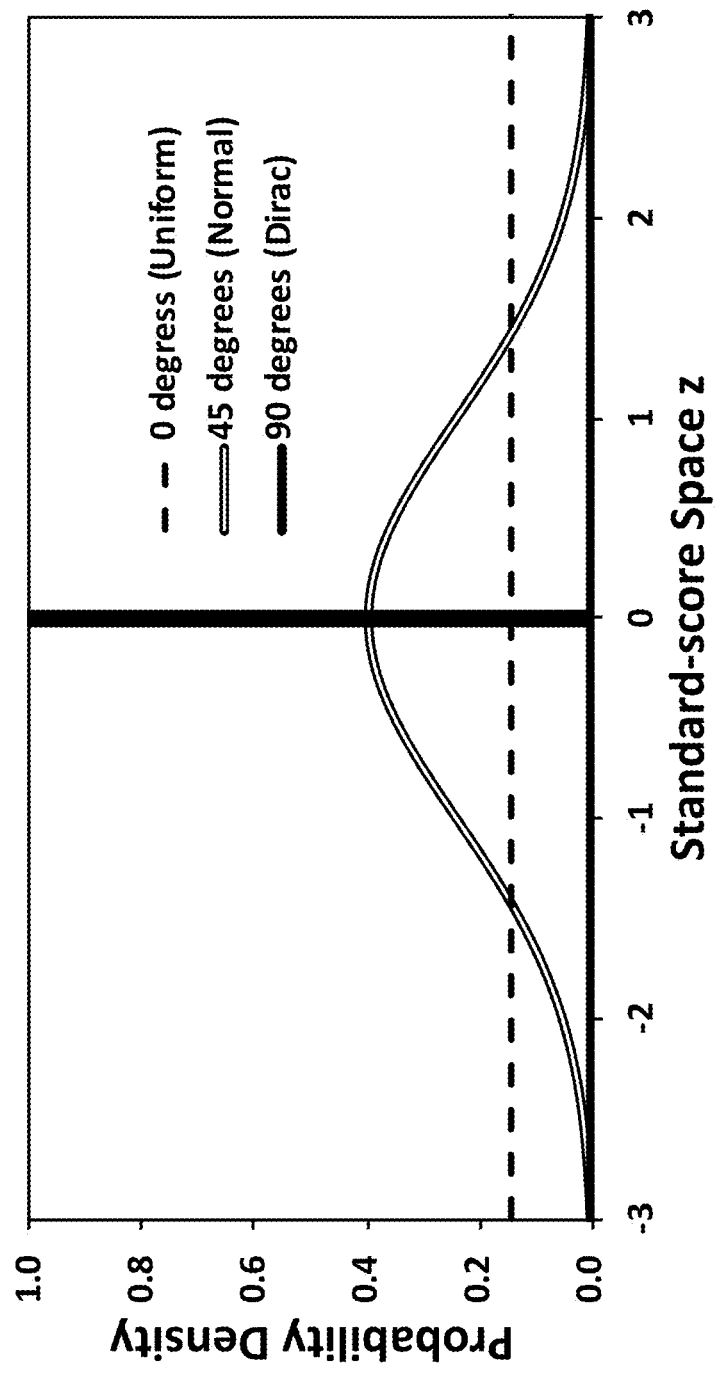
FIG. 12 is a chart illustrating an example of a probability density function in a standard-score space.
Figure 13:
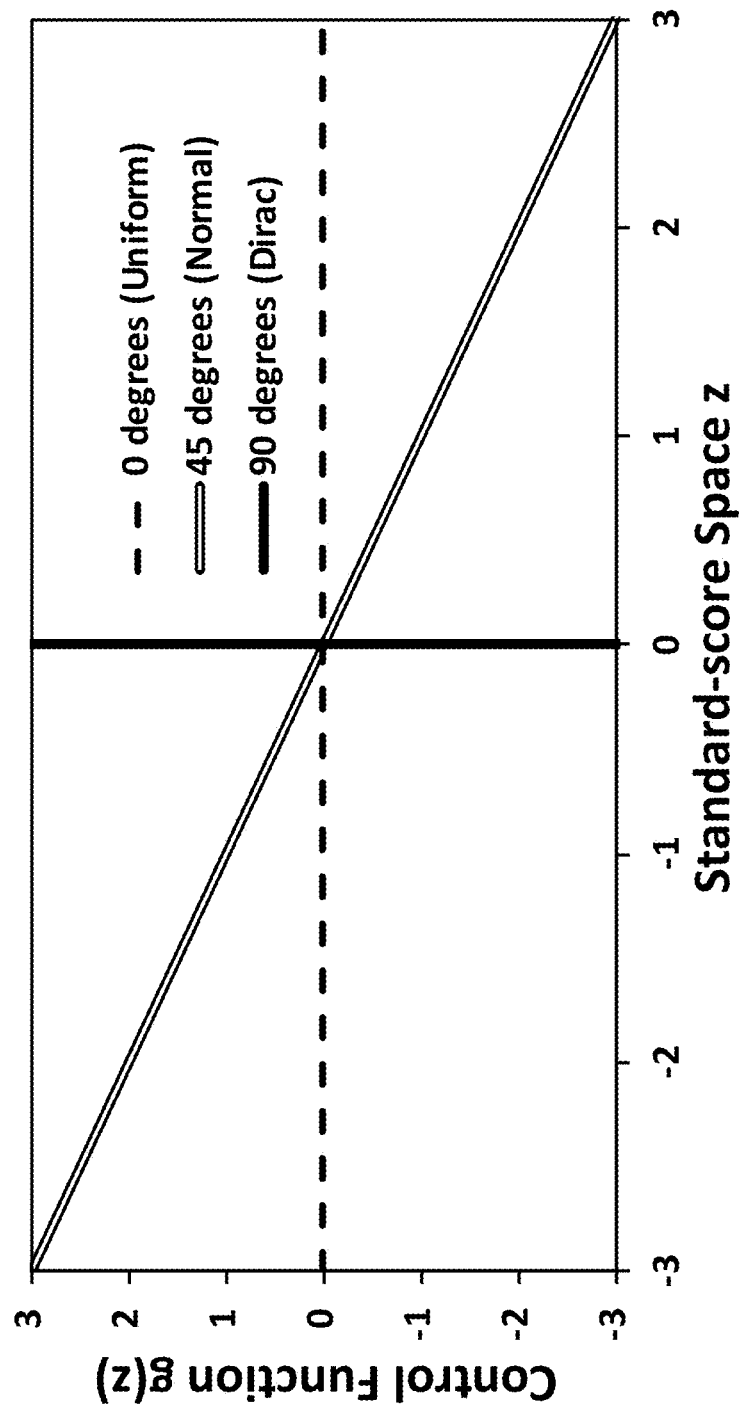
FIG. 13 is a chart illustrating an example of a control function in a standard-score space.

FIG. 12 illustrates an example showing that an $\alpha_2$ family of example PDFs are bounded by familiar functions, with the normal distribution being an intermediate case. FIG. 13 depicts corresponding example control functions for these example PDFs with the following angular slopes: $\alpha_2=0°$ produces a uniform distribution; $\alpha_2=45°$ produces a normal distribution; and, $\alpha_2=90°$ produces a Dirac Delta function. By progressively increasing the angle $\alpha_2$ from $0° \to 90°$, both the left and right-hand side tails of the PDF become less prominent and the distribution becomes more peaked. Note that $\alpha_2$ contributes to the symmetry of the PDF while $\alpha_1$ shifts it along the z axis. These numerical examples enforce $\alpha_1=0$ to ensure that the distribution is centered about the standard-score origin. Table 3, above, provides a general form defining the constant of integration for the $\alpha_2$ family of curves to be $\alpha_0 = -\ln|\sqrt{\alpha_2/2\pi}|$.

Figure 4:
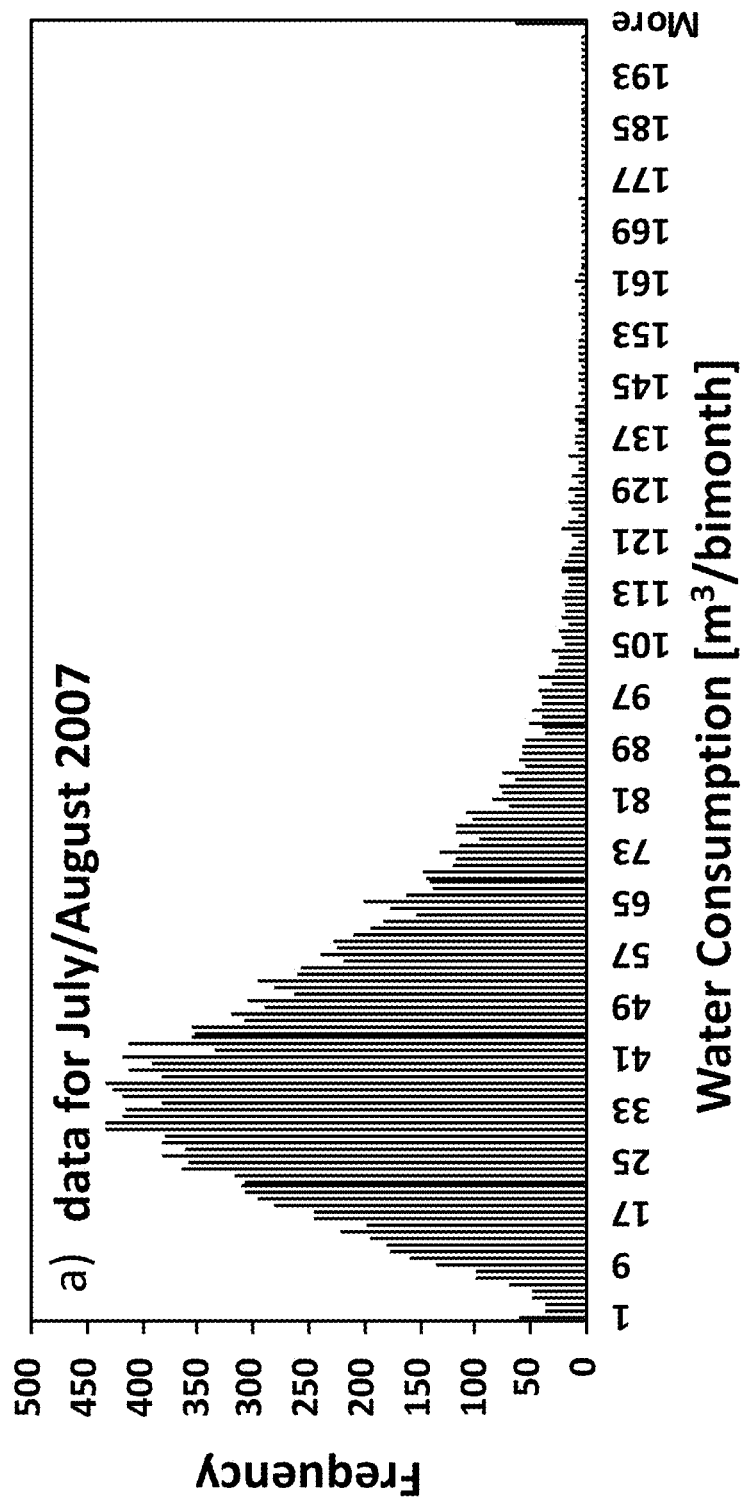
FIG. 4 is a chart illustrating a histogram of a water consumption example.
Figure 5:
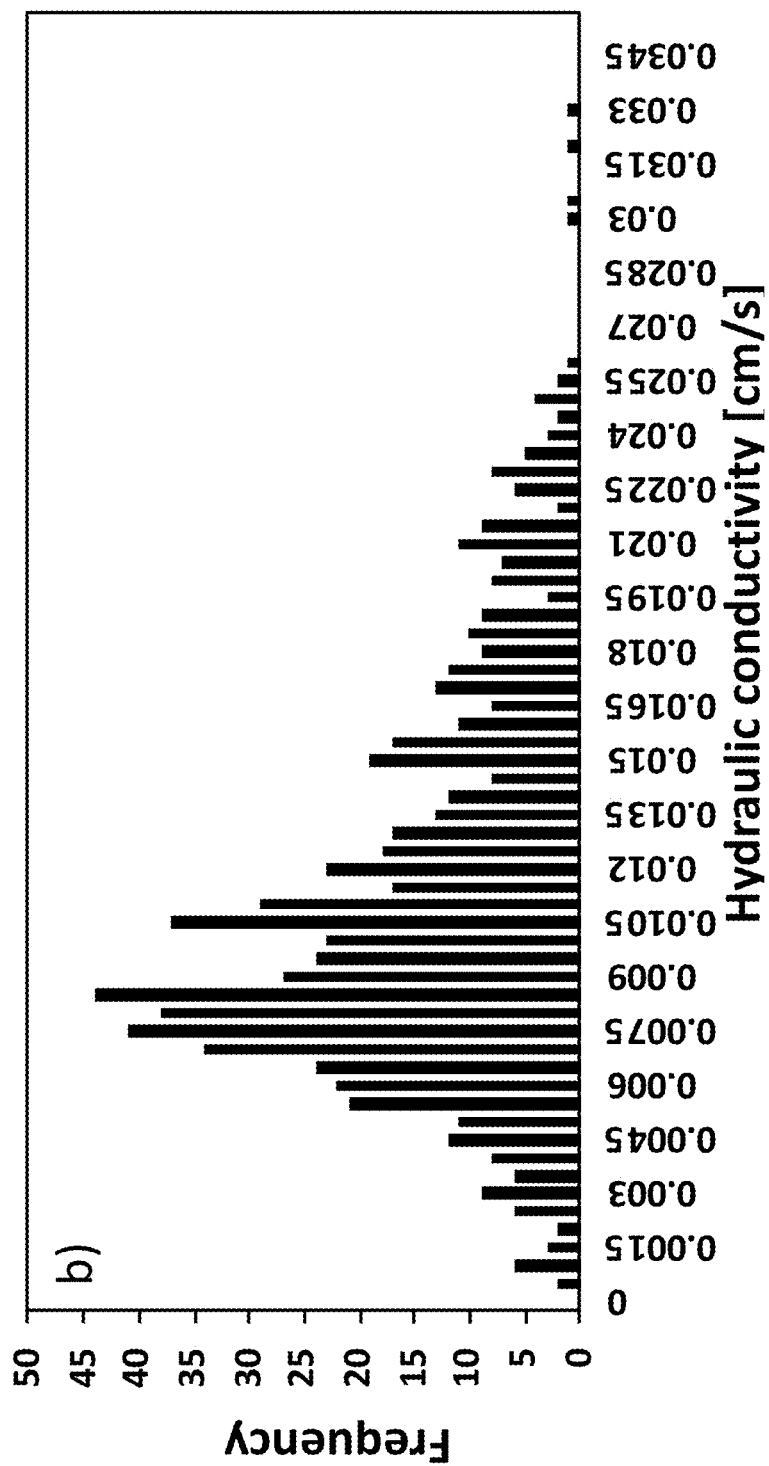
FIG. 5 is a chart illustrating a histogram of a hydraulic conductivity example.
Figure 6:
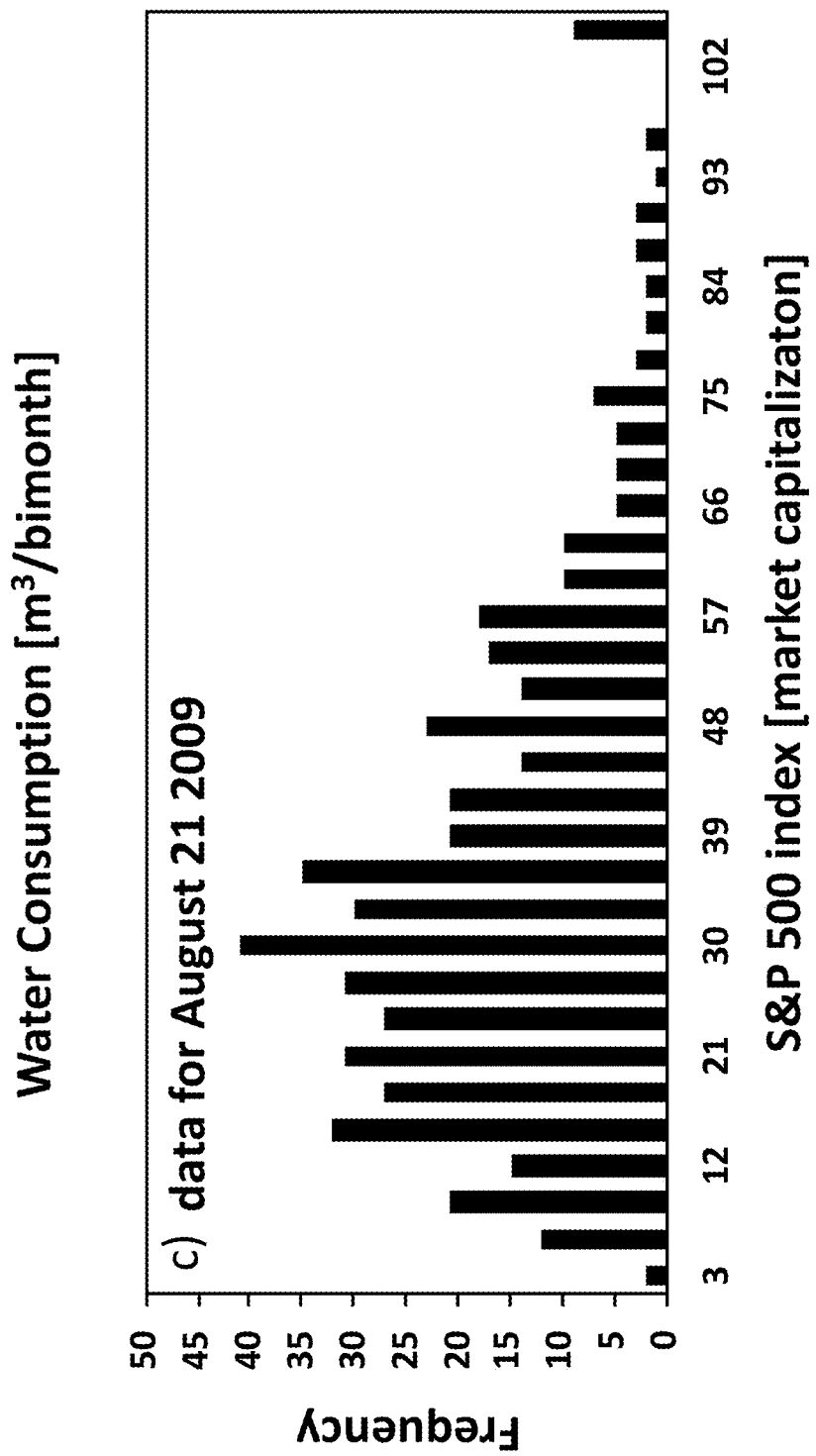
FIG. 6 is a chart illustrating a histogram of a stock index example.

In some cases, the $\alpha_2$ family of curves may not have enough freedom and flexibility to reproduce certain histograms of input data; for example, the histograms exemplified in FIGS. 4 to 6, which exhibit attributes of being asymmetric, shifted, tail-weighted, and even multi-modal. In such cases, the system 100 can extend the root polynomial control function, as exemplified in Equation (7), with additional polynomial or Fourier terms to adequately replicate the shape of these histograms.

FIGS. 4 to 6 illustrate examples of water consumption, hydraulic conductivity, and S&P 500 distributions that are unimodal, shifted, asymmetric, and tail-weighted. In order to replicate the shape of these types of histograms, the system 100 can extend the root polynomial control function to include additional terms in the series, as:

$$g_z = -\left[\alpha_1 + \tan\left(\frac{\alpha_2 \pi}{180}\right)z + \sum_{n_z=1}^{N_z} \alpha_{n_z+1} z^{n_z+1}\right] \qquad (8)$$

where $\alpha_{n_z}$ is the parametric constant, $n_z$ represents the order on the standard-score variable z, and $N_z$ is the total order of the control function in the standard-score space. As before, the distribution is primarily defined by $0°<\alpha_2<90°$, which ultimately contributes to convergence. Generally, terms subsequent to the root polynomial control function diminish in significance. Generally, the system 100 can use Equation (8) for distributions that are unimodal, but may be asymmetric, shifted, and tail-weighted. In general, odd polynomials $\alpha_{1, 3, 5, 7} \ldots$ contribute to the asymmetry of the PDF, whereas even polynomials $\alpha_{2, 4, 6, 8} \ldots$ contribute to the peakedness of the distribution. The integration constant $\alpha_0$ can be determined to ensure the PDF has unit area. In some cases, numerical integration may be used where analytical integration techniques for evaluating closed-form expressions of $\alpha_0$ for parametric PDFs are intractable.

FIG. 6 illustrates an example of a Lenna light intensity histogram as a multi-modal distribution, which generally cannot be replicated by a simple polynomial series. In cases with multi-modal distributions, the system 100 can accommodate the wave-like nature of multiple peaks by extending the root polynomial of the $\alpha_2$ family of curves to include a modified-Fourier series, $\mathcal{F}_{n_z,N_\mathcal{F}}$, as:

$$\mathcal{F}_{n_z,N_\mathcal{F}} = \sum_{n_\mathcal{F}=0}^{N_\mathcal{F}} v_{n_z,n_\mathcal{F}} \sin(\psi_{n_z,n_\mathcal{F}} z + \varrho_{n_z,n_\mathcal{F}}), \mathcal{F}_{n_z,0} = 0 \quad (9)$$

$$g_z = -\left[\alpha_1 + \mathcal{F}_{0,N_\mathcal{F}} + \tan\left(\frac{\alpha_2 \pi}{180}\right)\{1 + \mathcal{F}_{1,N_\mathcal{F}}\}z + \sum_{n_z=2}^{N_z} \mathcal{F}_{n_z,N_\mathcal{F}} z^{n_z}\right]$$

where $N_\mathcal{F}$ is the total number of modified-Fourier sinusoidal waves and $n_z$ represents the order of the standard-score variable z. Three constants, $v_{n_z,n_\mathcal{F}}$, $\psi_{n_z,n_\mathcal{F}}$ and $\varrho_{n_z,n_\mathcal{F}}$, parameterize each modified-Fourier series wave. Similar to the polynomial series extension, the control function is primarily controlled by $0°<\alpha_2<90°$. However, this approach allows for a period function to supplement the angular slope $\alpha_2$ along the horizontal axis. This permits the system 100 to use a modified-Fourier series for greater freedom for fitting oddly-shaped and even multi-modal datasets.

As described above, for example with respect to Table 1, the dimensionless median-relative space was described where the probability of occurrence for the discrete data was compared with parametric PDFs without bias from the median and standard deviation statistics. This permits the system 100 to compare seemingly disparate datasets by transforming the shape of the distribution from the standard-score space to the median-relative space:

$$p_y = \frac{m_{x,i}}{\sigma_{x,i}} p_z.$$

Minimizing the mean-squared error between the CDF $c_y$ and CMF $c_{y,k_1}$ in the median-relative space advantageously provides the system 100 with a robust objective function for parameterization of the control function.

Data measurements in the measurement space can be characterized as $x_i$. When transformed into median-relative $y_i$ or standard-score $z_i$ form, a natural upper bound may remain as an infinitely large measurement. However, very large magnitude measurements may be symptomatic of either excessive measurement error or perhaps observations from another distinct population. Population outliers can potentially bias the system's evaluation of the median and standard deviation, as well as the parameters within the control function given their reliance on the standard-score space. For at least these reasons, the system 100 can cull input data in accordance with a predefined and consistent upper bound in the median-relative space $y_{max}$ that removes potential population outliers from discrete datasets, and analogously, applies to any dataset regardless of location or scale.

In an embodiment, the system 100 only considers discrete data, or datasets having discrete date, within the range $x_0<x<x_{max}$; and hence, are comprised of real, non-zero, and positive measurements. This range reflects values on the median-relative axis on the interval $y_0<y<y_{max}$. The first position is the measurement-space origin, denoted by a zero-magnitude measurement $x_0=y_0=0$, transforms into the origin of the median-relative space. Before parameterizing a PDF to reflect the shape of the histogram, the system 100 discards all data greater than a predetermined culling threshold $y_i>y_{max}$. In most cases, $y_{max}$ is selected to be a multiple of "$m_{y,i}=1$", which can then be applied as the same value to each histogram. In this way, a consistent data culling threshold $y_{max}$ ensures data are retained to the same degree for the disparate datasets, regardless of their scale in the measurement space.

Data culling can potentially introduce recursive adjustments in the median and culling threshold and hence mapping of $x_i \leftrightarrow y_i \leftrightarrow z_i$. However, generally, the median is insensitive to the low frequency at which extremely large erroneous measurements occur, and hence datasets may require significant culling before observing changes to the median. In contrast, the standard deviation can be quite sensitive to high magnitude outliers. Therefore, in some cases, data culling can be used to generate a correct estimation of $\sigma_{x,i}$ providing accurate and consistent mapping between the continuous representation of the discrete data between each spatial transformation $x \leftrightarrow y \leftrightarrow z$; for example, as shown on Table 1.

Upon culling population outliers, the system 100 can minimize an objective function using a mean-squared error (MSE) approach to estimate parameters within the polynomial and/or modified-Fourier series control functions. Using this approach, the system 100 can use the objective function to penalize the difference between the CDF and CMF as:

$$MSE_{c,y} = \frac{1}{N_k} \sum_{k=1}^{N_k} [c_y - c_{y,k}]^2 \quad (10)$$

where $N_k$ represents the number of bins in the analysis. The system 100 can minimize the MSE in Equation (10) to generate a parametric PDF that approximately reproduces the shape of the histogram data. Generally, this minimization approach can use the hierarchal relationship between the control function, PDF, and CDF to ensure that the parametric PDF correctly reproduces the PMF for all reasonable measurements along each spatial representation, concurrently.

Advantageously, the system 100 can use the median-relative space to produce equally-spaced probability interval bins k, while allowing application of the objective function to many datasets; for example, datasets as disparate as those in FIGS. 4 to 7. Additionally, these bins can be defined independent of, and prior to, the control function parametrization.

The mean of the input distribution can be fully defined by a combination of median, standard deviation, and control function statistics. The probability-weighted mean for a PDF $p_z$ in the standard-score space for interval $z_0 \le z \le z_1$ can be defined as:

$$\mu_z = \int_{z_0}^{z_1} z p_z dz \quad (11)$$

where $\mu_z$ represents the mean statistic in the standard-score space z. The mean statistic occupies a single position on the distribution and can be mapped through each spatial orientation. Equation (12) illustrates this mapping of the mean statistic for the parametric PDF between $x \leftrightarrow y \leftrightarrow z$. Further, it illustrates that the mean can be entirely defined by the median, standard deviation, and control function as follows:

$$\mu_x = m_{x,i} \mu_y = m_{x,i} + \sigma_{x,i} \mu_z \Rightarrow \mu_x = m_{x,i} + \sigma_{x,i} \int_{z_0}^{z_1} [z \exp(\int g_z dz)] dz \quad (12)$$

The arithmetic mean of the discrete dataset can be compared to the probability-weighted mean of the corresponding parametric PDF to empirically evaluate its goodness of fit. Generally, the mean statistic on its own may not be sufficient to characterize goodness of fit because there may be an infinite number of distributions that could result in the same mean statistic but with varying shapes. Therefore, the mean statistic is not necessarily included in the objective function. However, advantageously, the mean statistic of the parametric PDF will naturally gravitate toward the arithmetic mean of the discrete dataset as a consequence of 24 minimizing the objective function in Equation (10).

The system 100 can use Equation (13) to relate the arithmetic mean in the measurement space $\mu_{x,i}$ to an analogous value in the median-relative space $\mu_{y,i}$:

$$\mu_{y,i} = \frac{1}{N_i} \sum_{i=1}^{N_i} y_i = \frac{1}{m_{x,i} N_i} \sum_{i=1}^{N_i} x_i \quad (13)$$

$$\therefore \mu_{x,i} = \frac{1}{N_i} \sum_{i=1}^{N_i} x_i, \quad \therefore \mu_{y,i} = \frac{1}{m_{x,i}} \mu_{x,i}$$

Advantageously, the median-relative space arithmetic mean $\mu_{y,i}$ can be defined as a transformation of the measurement space arithmetic mean:

$$\mu_{y,i} = \frac{1}{m_x} \mu_{x,i}.$$

This ratio is unity for a normal distribution and increases in value as the distribution becomes progressively tail-heavy.

Using a MSE approach, the system 100 can use Equation (14) to provide an independent measure to verify the parametrization of the control function fitting the CDF $c_x$ to the CMF $c_{x,k_1}$:

$$MSE_{\mu,y} = [\mu_{y,i} - \mu_y]^2 \quad (14)$$

Equation (14) can be considered analogous to the objective function, but instead can be used by the system 100 to measure how effectively the control function selection expresses the continuum behaviour of the collective data. By minimizing the objective function given by Equation (10), the system 100 can constrain the continuous PDF to be nearly identical to the PMF, given an appropriate control function. In most cases, the objective function in Equation (10) does not have to guarantee that Equation (14) represent a global minimum. Experiments conducted by the present inventors show that selecting an appropriate control function results in commensurate accuracy for the $MSE_{c,y}$ and $MSE_{\mu,y}$.

The system 100 can use the median, standard deviation, and control function parametrization to embody all of the information necessary to reproduce the discrete dataset as a PDF. In this way, the system 100 can compress information pertaining to a distribution into a reduced set of scalar values. Advantageously, a median-relative space can ensure a constant frame of reference for evaluating the scale and shape of a PDF, and provides the foundation for viewing the mean statistic as a solution to an advection-dispersion problem (see, for example, Equation (12)).

In some cases, the system 100 can use a degrees of freedom analysis to evaluate the effectiveness of compressing the histogram data into a PDF using the median, standard deviation, and control function parametrization. Assuming these statistics represent one degree of freedom each, the parametric compression of any dataset can be evaluated by the system 100 in the median-relative space using the relationships in Table 4:

TABLE 4

Degrees of freedom.

| Description | Measure | Degrees of Freedom |
| --- | --- | --- |
| Arithmetic Mean | $\mu_{y,i} = \frac{1}{N_i} \sum_{i=1}^{N_i} y_i$ | $N_\mu = 1$ |
| Probability-Weighted Mean | $\mu_y = \int_{y_0}^{y_1} y p_y dy$ | |
| Median | $m_{y,i} = 1$ | $N_m = 1$ |
| Standard Deviation | $\sigma_{y,i} = \frac{\sigma_{x,i}}{m_{x,i}}$ | $N_\sigma = 1$ |
| Control Function | $g_z(\alpha, \nu, \psi, \varrho \ldots N_{CF})$ | $N_{CF}$ |
| PDF | $p_y = \frac{m_{x,i}}{\sigma_{x,i}} \exp\left(\int g_z dz\right)$ | $N_{PDF} = N_\mu + N_m + N_\sigma + N_{CF}$ |
| Parametric Compression | $\alpha, \nu, \psi, \varrho$ | $N_{PC} = N_i - N_{PDF}$ |
| Discrete Data | $x_i$ | $N_i$ |
| Compression Efficiency | $\mathcal{C}$ | $\frac{N_i - N_{PDF}}{N_i} \times 100\%$ | where $N_i$ represents the data remaining after culling.

Figure 7:
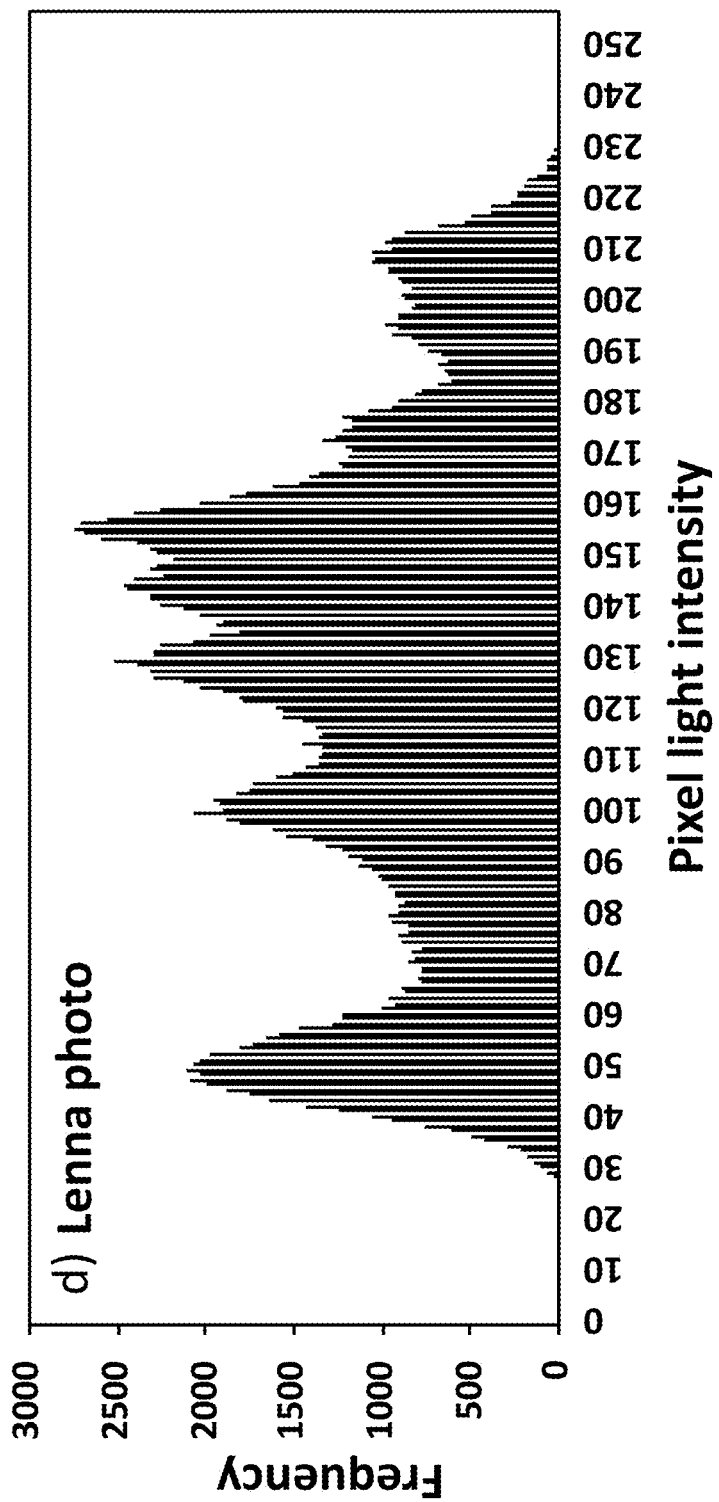
FIG. 7 is a chart illustrating a histogram of a pixel intensity example.
Figure 8:
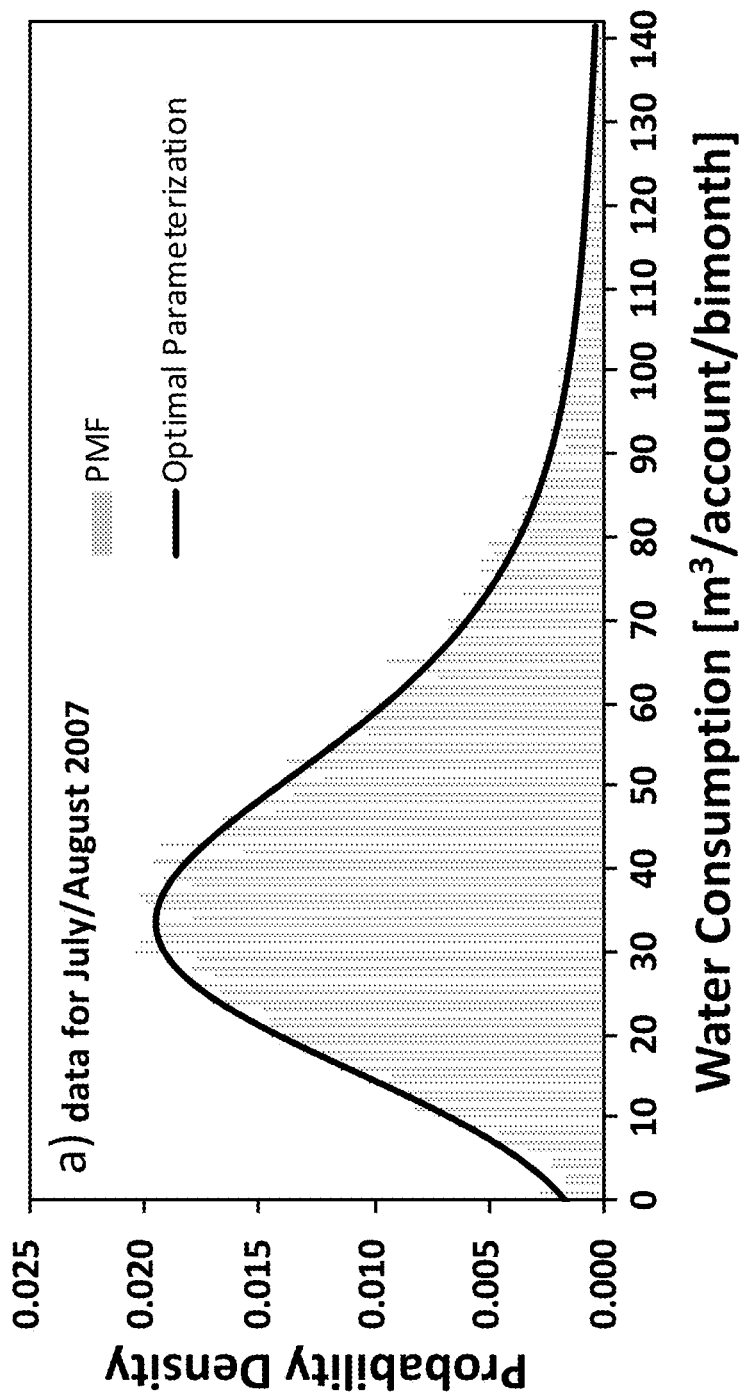
FIG. 8 is a chart illustrating a parameterization of the example of FIG. 4 using the system of FIG. 1.
Figure 9:
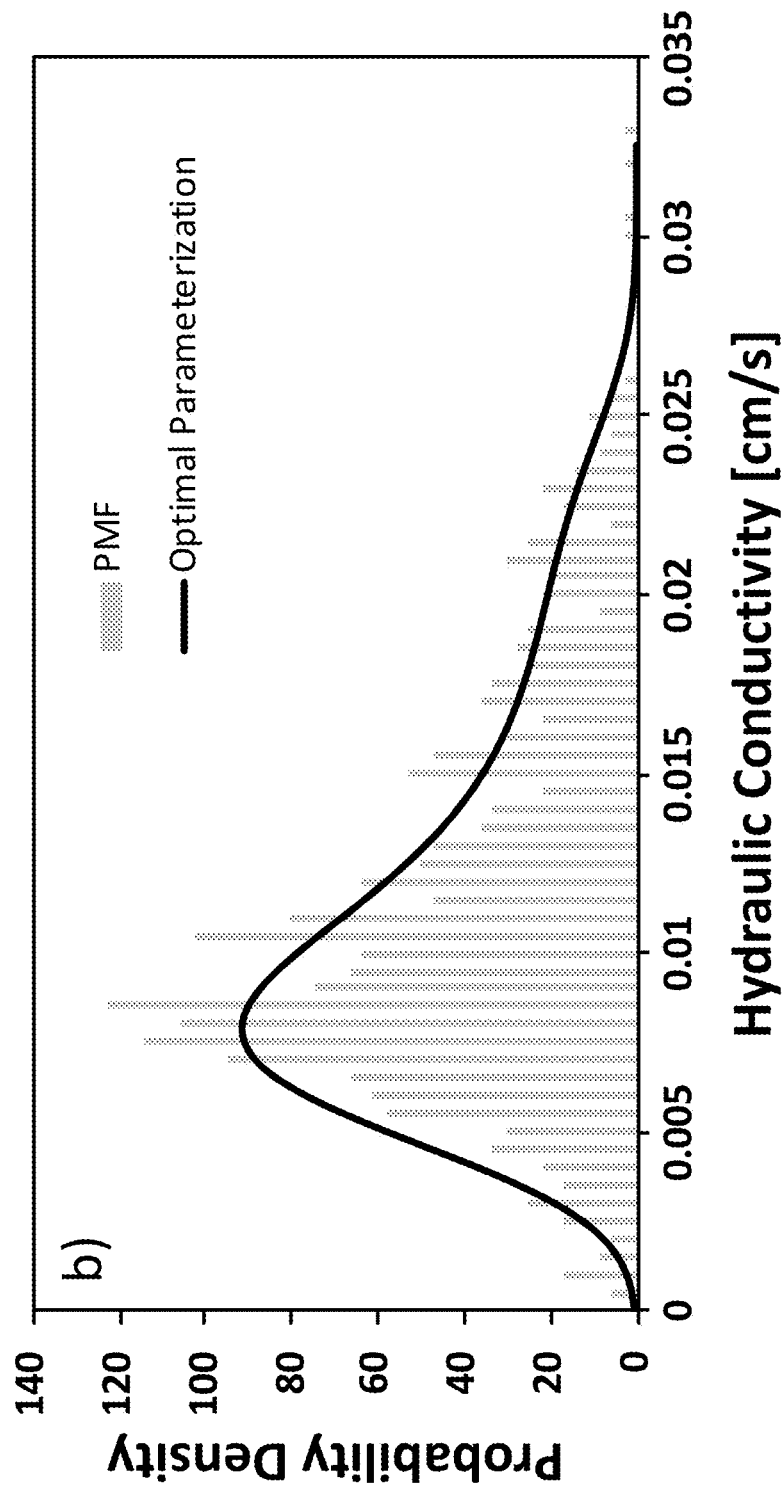
FIG. 9 is a chart illustrating a parameterization of the example of FIG. 5 using the system of FIG. 1.
Figure 10:
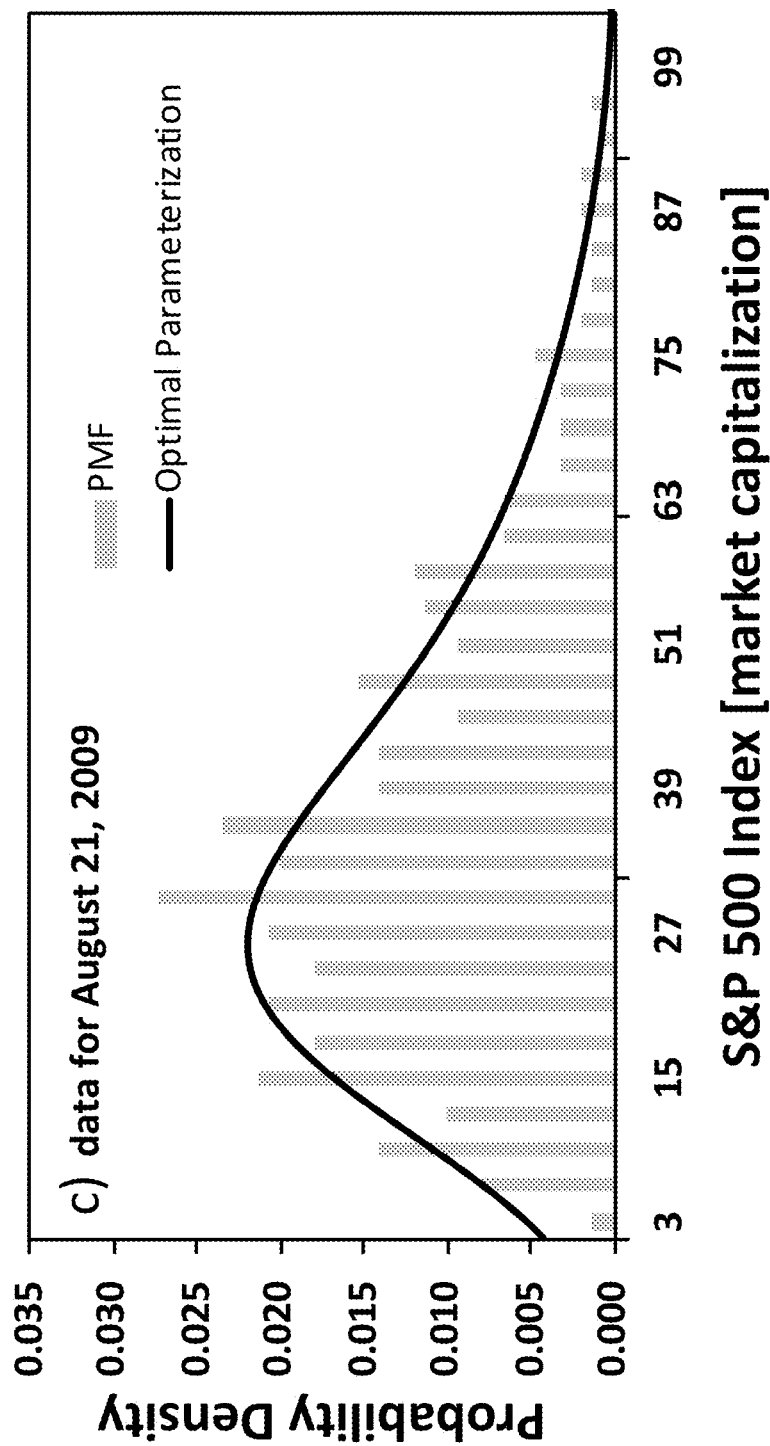
FIG. 10 is a chart illustrating a parameterization of the example of FIG. 6 using the system of FIG. 1.
Figure 11:
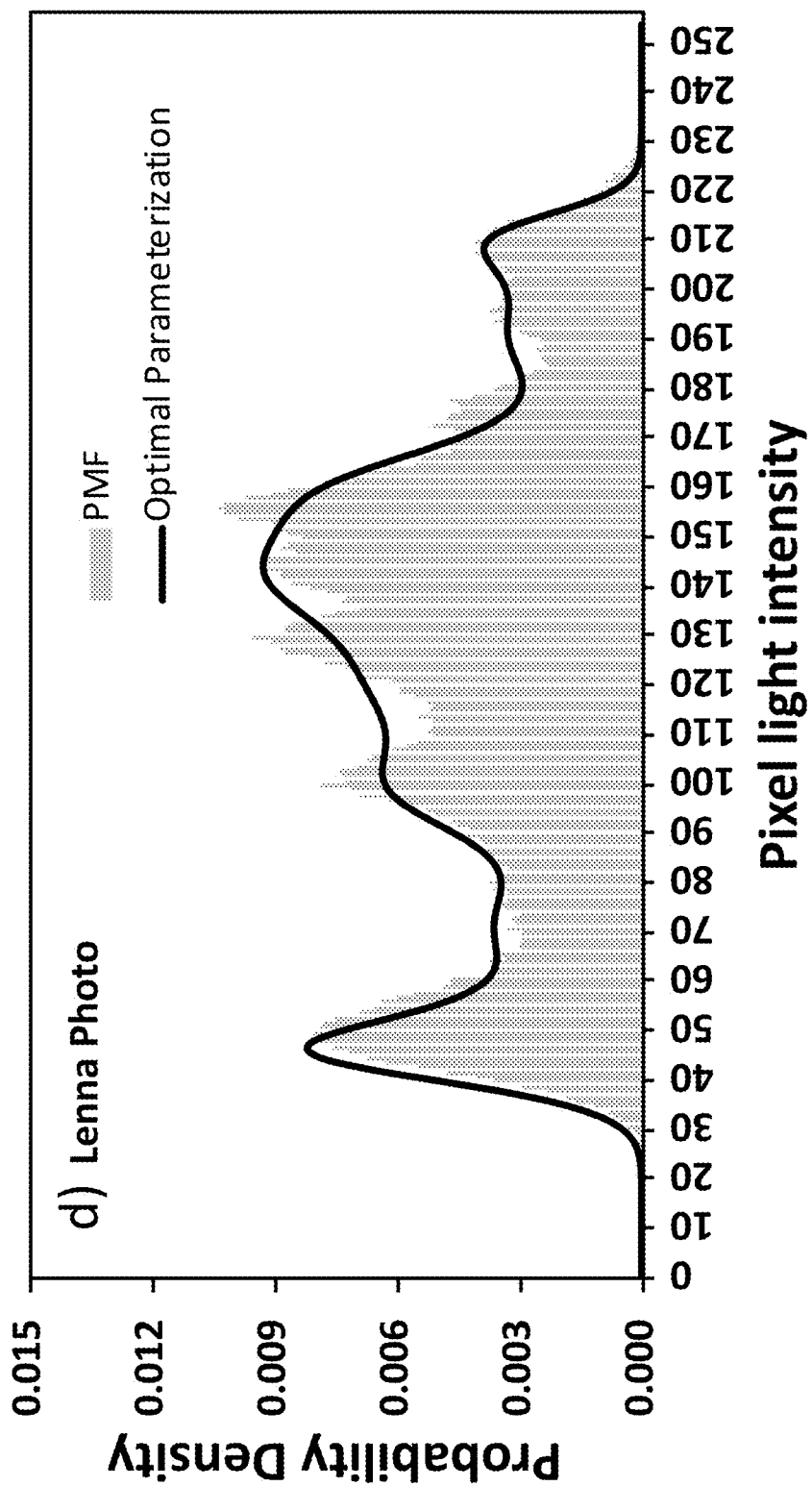
FIG. 11 is a chart illustrating a parameterization of the example of FIG. 7 using the system of FIG. 1.

The present inventors conducted example experiments using the embodiments described herein. This example experiments were conducted on the input datasets represented by the water consumption, hydraulic conductivity, Standard & Poor's (S&P) 500 index, and pixel light intensity histograms shown on FIGS. 4 to 7, respectively; which represent datasets from economics, engineering, finance, and image analysis. The diversity of data sources was intended to strengthen the illustration of the generality of the present embodiments. FIG. 4 illustrates a histogram showing single-family residential water consumption data from the July/August bimonthly billing period within the City of Waterloo, Ontario, Canada. FIG. 5 illustrates a histogram showing hydraulic conductivity measurements obtained from section cores drilled along a single cross-section within the Borden aquifer. FIG. 6 illustrates a histogram showing S&P 500 market capitalization index values obtained from information collected on Aug. 21, 2009. FIG. 7 illustrates a histogram showing light intensity data obtained from the classic "Lenna" photograph.

In these example experiments, the system 100 estimated the median and standard deviation, while culling data from the water consumption and S&P 500 datasets using $0<y_i<4$ as the range for inclusion. Particulars of the data culling are summarized in Table 5. In this example, both the hydraulic conductivity and light intensity datasets do not require culling as all data exist on the interval $0<y_i<4$. Note that $y_i$ is dimensionless and hence no units are reported for the various datasets. The water consumption data has 162 data points beyond the culling threshold $y_{max}=4$ that have a disproportionate influence on the standard deviation of the distribution. Including these data points increases the standard deviation from $2.57 \times 10^1$ to $2.93 \times 10^1$, which is an increase of approximately 15% for data reflecting less than 1% of the population. Failure to cull this data would bias the parameter estimation of the control function when enforcing $c_{y,k_1} \cong c_y$. The S&P 500 data has 8 points beyond the threshold $y_{max}=4$ that have a disproportionate influence on the arithmetic mean of the distribution. Including these data points increases the arithmetic mean from $3.40 \times 10^1$ to $3.77 \times 10^1$, which is an increase of approximately 11% for data reflecting less than 2% of the population. Variation in the mean statistic suggests the culled data has undue influence on the shape of the distribution, because the median and standard deviation remain relatively constant.

TABLE 5

Summary of statistics for the four histograms.

| | Water Consumption | Hydraulic Conductivity | S&P 500 Index | Lenna Light Intensity |
|---|---|---|---|---|
| Data and Statistics | | | | |
| Total Measurements | 22,509 | 720 | 499 | 262,144 |
| Data Points Culled | 162 | 0 | 8 | 0 |
| Analysis Data Points ($N_i$) | 22,347 | 720 | 491 | 262,144 |
| Median ($m_{x,i}$) | $4.00 \times 10^1$ | $9.93 \times 10^{-3}$ | $3.07 \times 10^1$ | $1.29 \times 10^2$ |
| Standard deviation ($\sigma_{x,i}$) | $2.57 \times 10^1$ | $5.64 \times 10^{-3}$ | $1.97 \times 10^1$ | $4.81 \times 10^1$ |
| Arithmetic Mean ($\mu_{x,i}$) | $4.45 \times 10^1$ | $1.11 \times 10^{-2}$ | $3.40 \times 10^1$ | $1.23 \times 10^2$ |
| Polynomial Series Extension | | | | |
| PDF ($N_{PDF}$) | 8 | 8 | 8 | n/a |
| Parametric Compression ($N_{PC}$) | 22,339 | 712 | 483 | n/a |
| Compression Efficiency ($\mathcal{C}$) | 99.28% | 98.89% | 98.37% | |
| Modified-Fourier Series Extension | | | | |
| PDF($N_{PDF}$) | 8 | 8 | 8 | 17 |
| Parametric Compression ($N_{PC}$) | 22,339 | 712 | 483 | 262,127 |
| Compression Efficiency ($\mathcal{C}$) | 99.28% | 98.89% | 98.37% | 99.99% |

The culled discrete data representing the water consumption, hydraulic conductivity, and S&P 500 index sources were arranged into 16 discrete bins of size $\Delta y=0.25$ within the median-relative space over the interval $0 \le y \le 4$. Given the multi-modal nature of the Lenna histogram, the example experiment used 86 discrete bins of size $\Delta y \cong 0.0234$ over the interval $0 \le y \le 4$ to resolve the PMF as a PDF. After culling the population outliers, the system 100 determined the probability of occurrence within the aforementioned $\Delta y$ intervals. The system 100 summed these probabilities into a CMF $c_{x,k_1}$, and then mapped to $c_{y,k_1}$ using the median statistic $m_{x,i}$.

Selecting a control function $g_z(\alpha, \upsilon, \psi, \varrho \ldots N_{CF})$ from Equations (8) and (9) allows replication of the CMF $c_{y,k_1}$ of each dataset as a CDF $c_y$. The system 100 estimates parameter $\alpha, \upsilon, \psi, \varrho$ within the control function for either the polynomial or modified-Fourier series $\varrho$ extensions. In this example experiment, both the polynomial and modified-Fourier series extensions are considered for the unimodal datasets and the modified-Fourier series extension was considered for the unimodal and multi-modal datasets. The parameter $\alpha_0$ in Equations (6) and (7) are similarly present in the standard-score PDFs and numerical integration constrains $\alpha_0$ to ensure unit area beneath each PDF. This scaling process ensures conservation of probability for each application. Simpson's Rule was applied within the standard-score space using a discretization of $\Delta z = 0.02$ on the $$\text{interval} - \frac{m_{x,i}}{\sigma_{x,i}} < z < \frac{y_{max}-1}{\frac{\sigma_{x,i}}{m_{x,i}}},$$

while concurrently changing the control function parameters to minimize the objective function in Equation (10). Table 6 illustrate characteristic control functions that parametrically reproduce each dataset.

The system 100 applied the exponential polynomial and modified-Fourier series parameterization for each of the water consumption, hydraulic conductivity, and S&P 500 index input datasets. In some cases, these parameterizations may require the same number of terms to reproduce the datasets through the polynomial and modified-Fourier series extensions of the control function. The polynomial series extension for these three input datasets had two additional terms applied beyond the root polynomial control function. Additionally, the modified-Fourier series extension for these three input datasets had one sinusoidal wave with three additional parameters applied beyond the root polynomial control function. In this case, the parametric compression $N_{PC}$ for both the polynomial and modified-Fourier series extensions were identical. Note that $\varrho_{0,1}$ for the water consumption, hydraulic conductivity, and S&P 500 index data is necessarily "zero" because the slope of the control function does not change from negative to positive, thus there is no change in concavity. Hence, only $\upsilon_{0,1}$ and $\psi_{0,1}$ contribute to replicating discrete data as unimodal PDFs. This ensured that the compression efficiency $\mathcal{C}$ is identical for both control function extensions as applied to these unimodal distributions.

TABLE 6

The polynomial and modified-Fourier series control functions.

Water Consumption, Hydraulic Conductivity, and S&P 500 Index Data

| Polynomial Series | $g_z = -\left[a_1 + \tan\left(\frac{\alpha_2 \pi}{180}\right)z + \alpha_3 z^2 + \alpha_4 z^3\right]$ |
|---|---|
| Modified-Fourier Series | $\mathcal{F}_{0,1} = \upsilon_{0,1} \sin(\psi_{0,1} z + \varrho_{0,1})$ |
| | $g_z = -\left[a_1 + \mathcal{F}_{0,1} + \tan\left(\frac{\alpha_2 \pi}{180}\right)z\right]$ |

TABLE 6-continued

The polynomial and modified-Fourier series control functions.

Lenna Intensity Parametric Control Function

Figure 14:
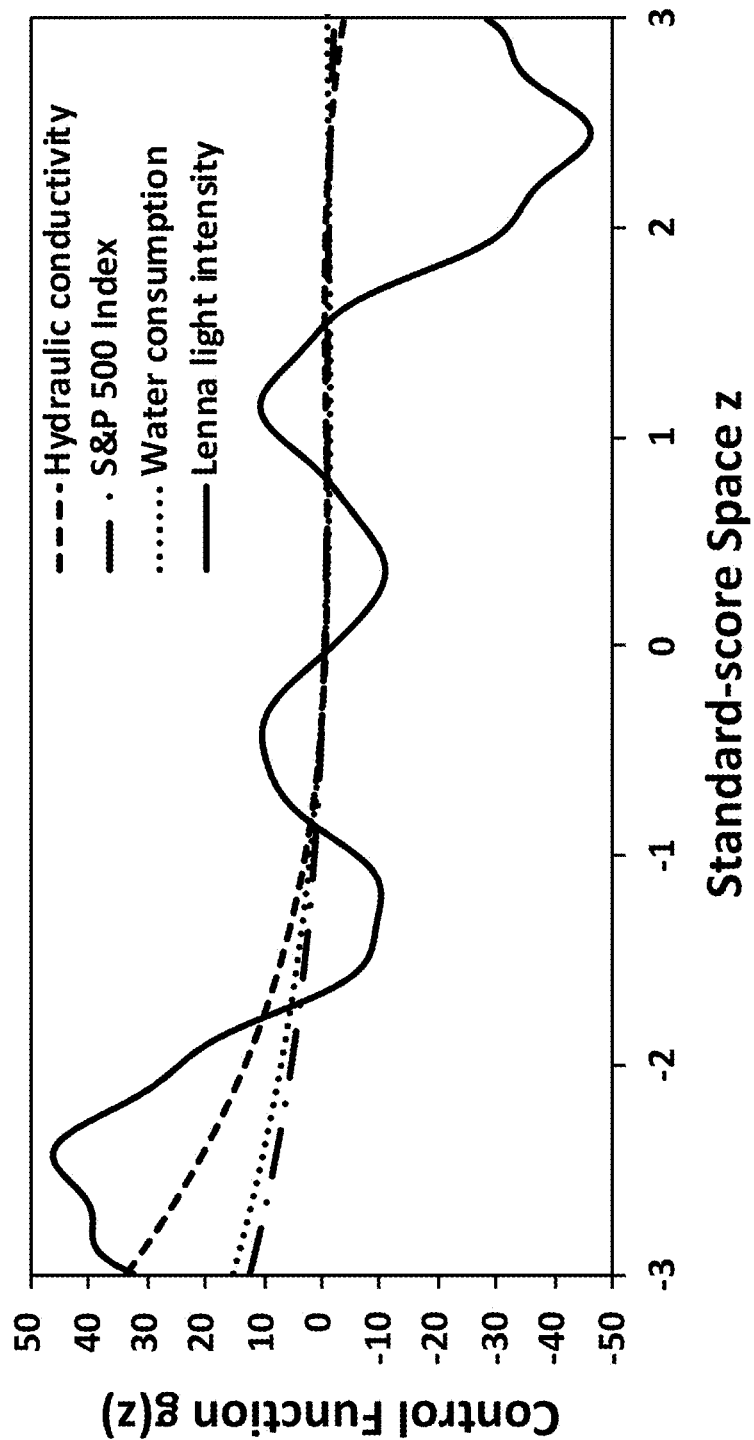
FIG. 14 is a chart illustrating four examples of control functions in a standard-score space.
Figure 15:
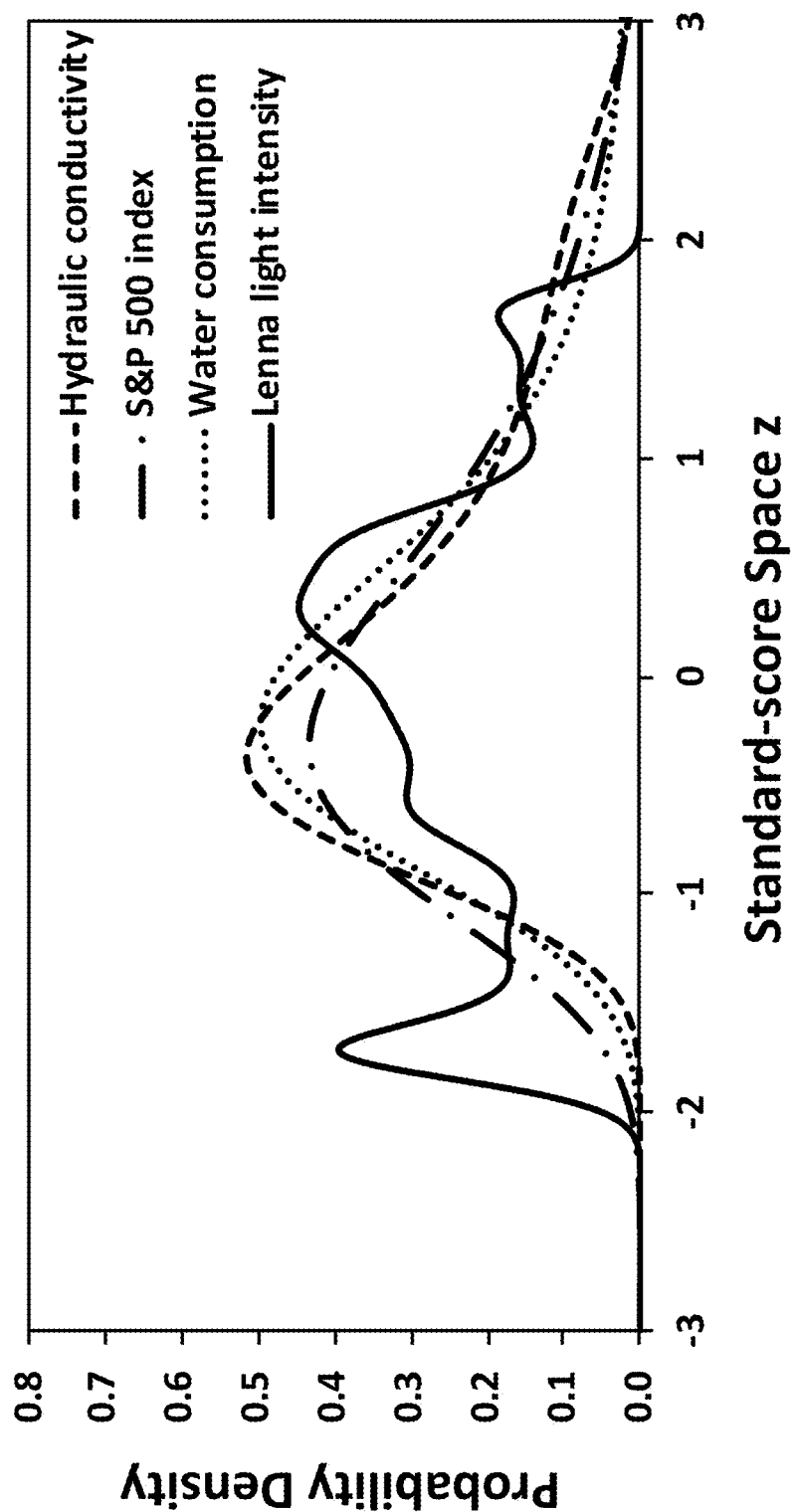
FIG. 15 is a chart illustrating four examples of probability density functions in a standard-score space.
Figure 16:
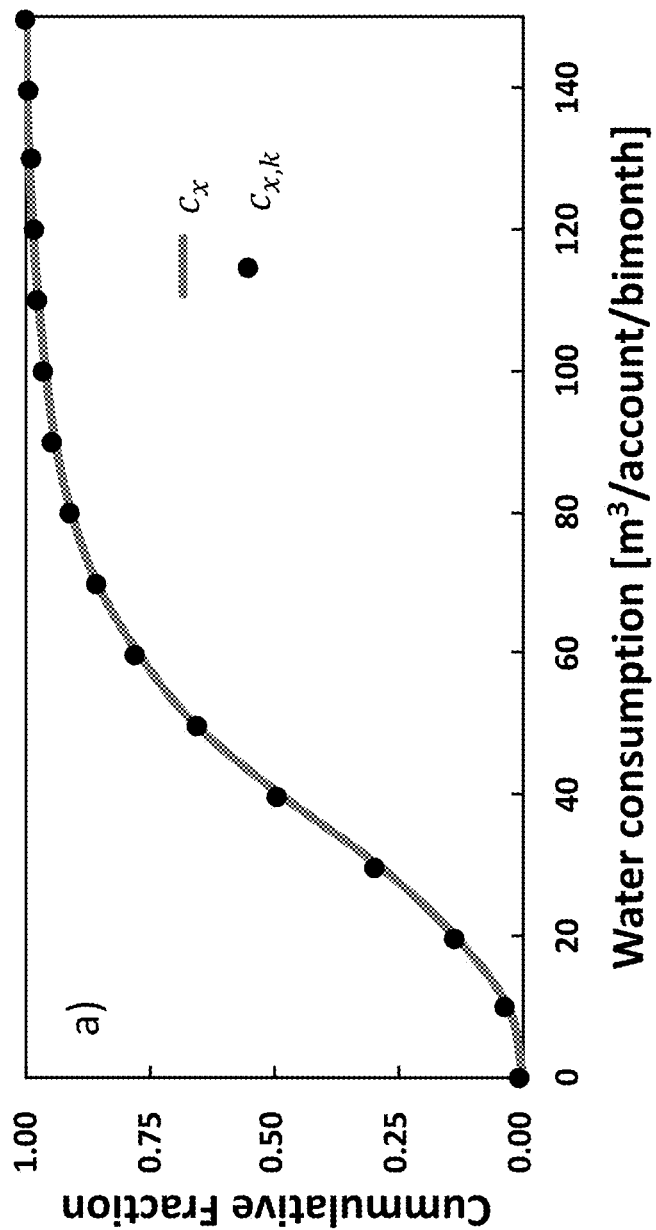
FIG. 16 is a chart illustrating a comparison between discrete and continuous cumulative density function after achieving a minimum objective function for the example of FIG. 4.
Figure 17:
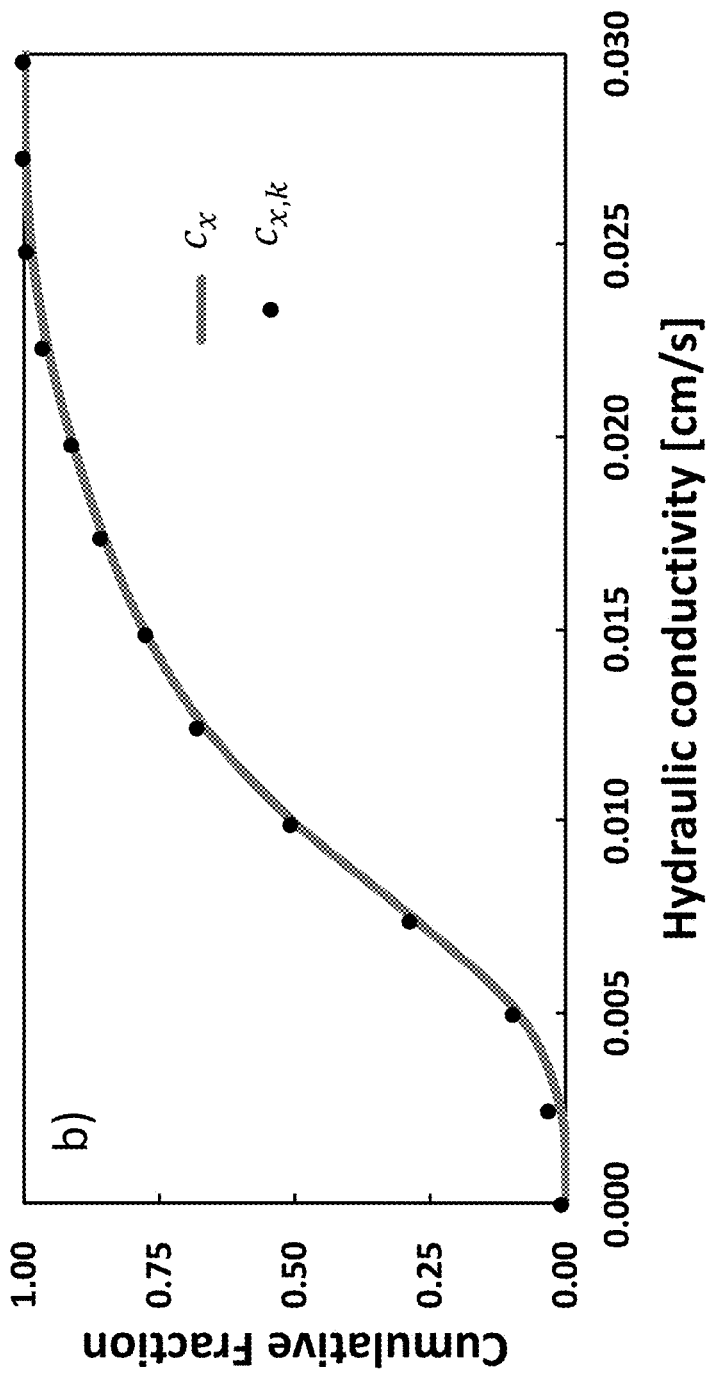
FIG. 17 is a chart illustrating a comparison between discrete and continuous cumulative density function after achieving a minimum objective function for the example of FIG. 5.
Figure 18:
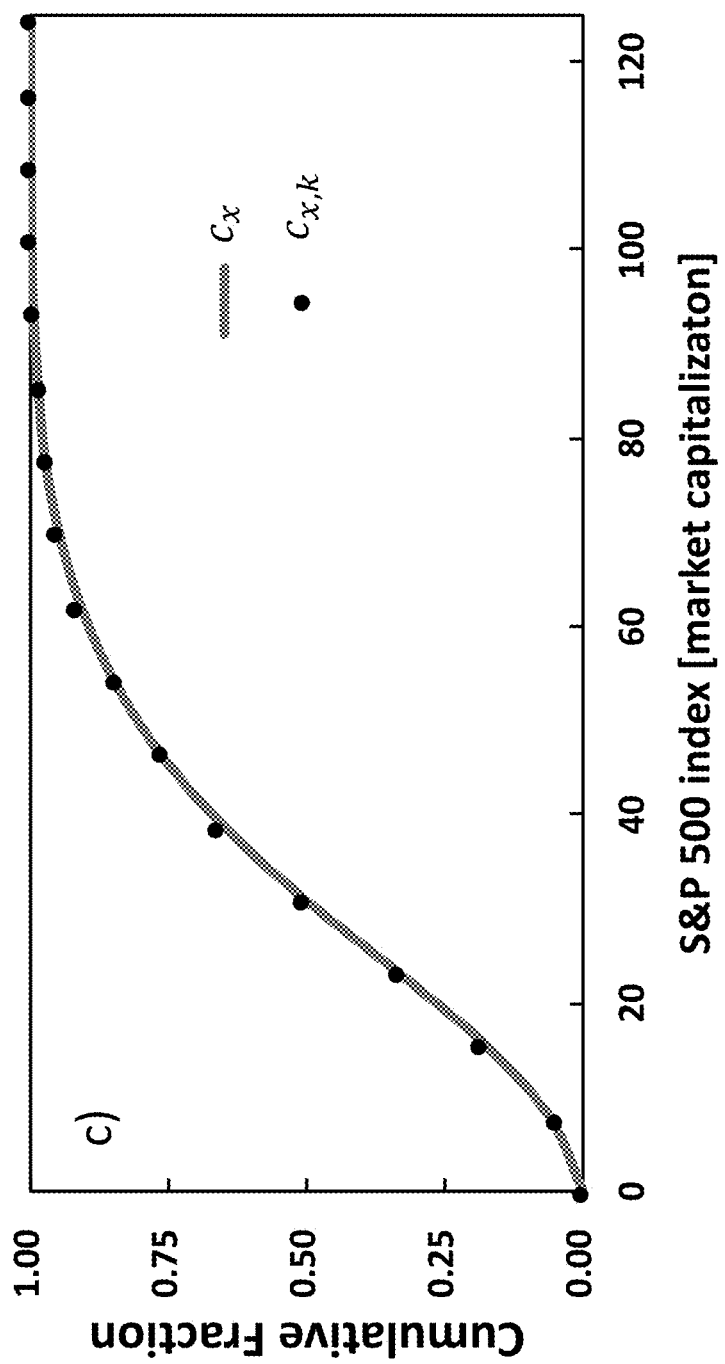
FIG. 18 is a chart illustrating a comparison between discrete and continuous cumulative density function after achieving a minimum objective function for the example of FIG. 6.
Figure 19:
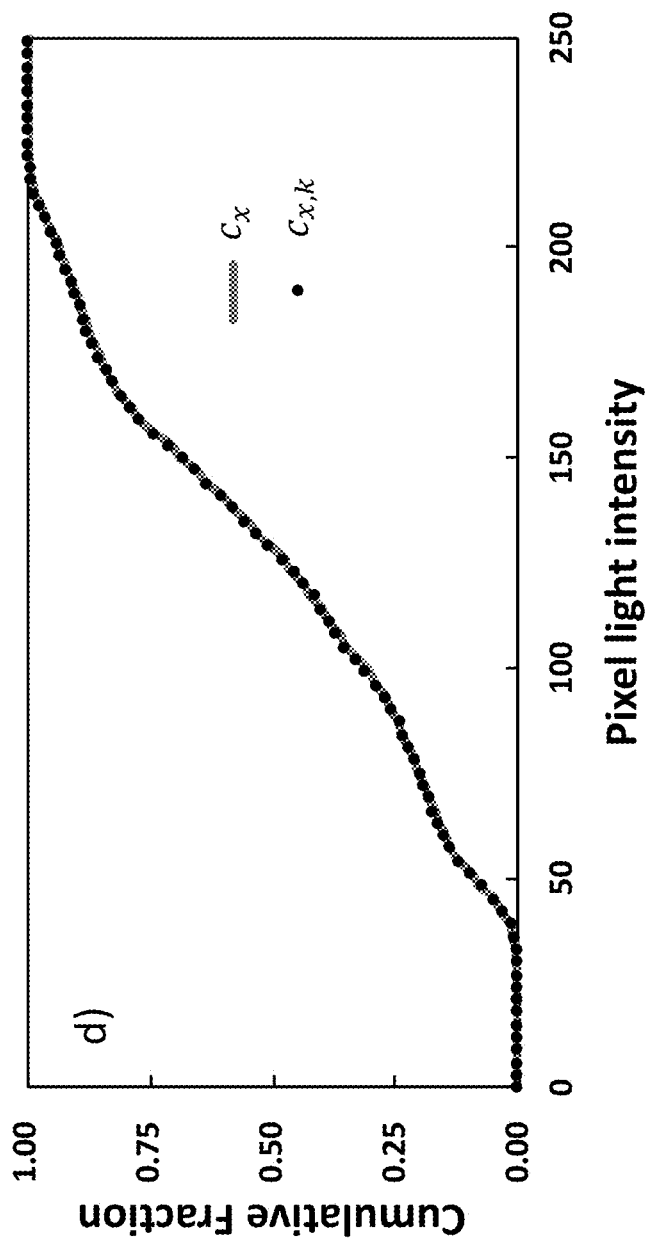
FIG. 19 is a chart illustrating a comparison between discrete and continuous cumulative density function after achieving a minimum objective function for the example of FIG. 7.
Figure 20:
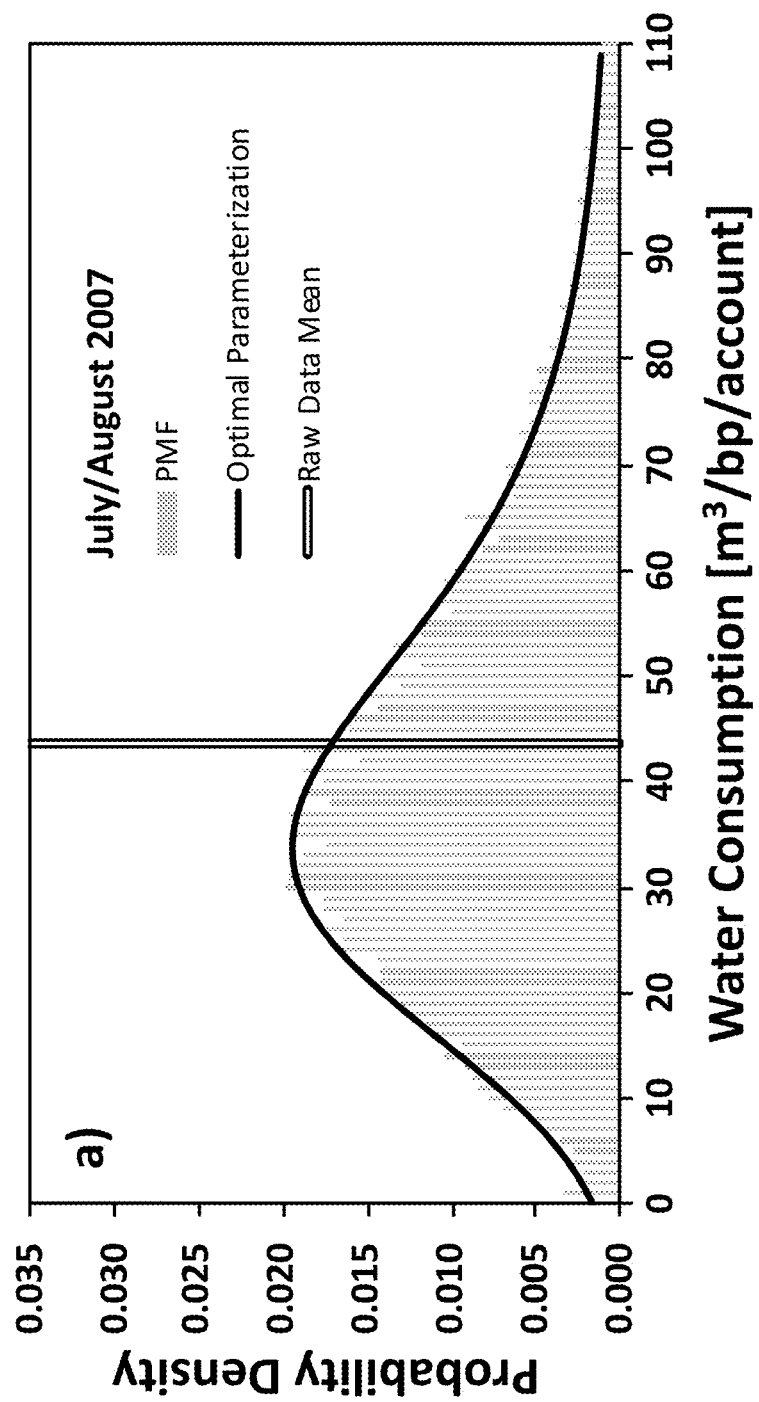
FIG. 20 is a chart illustrating a probability mass function for a water consumption example for the months of July/August 2007.
Figure 21:
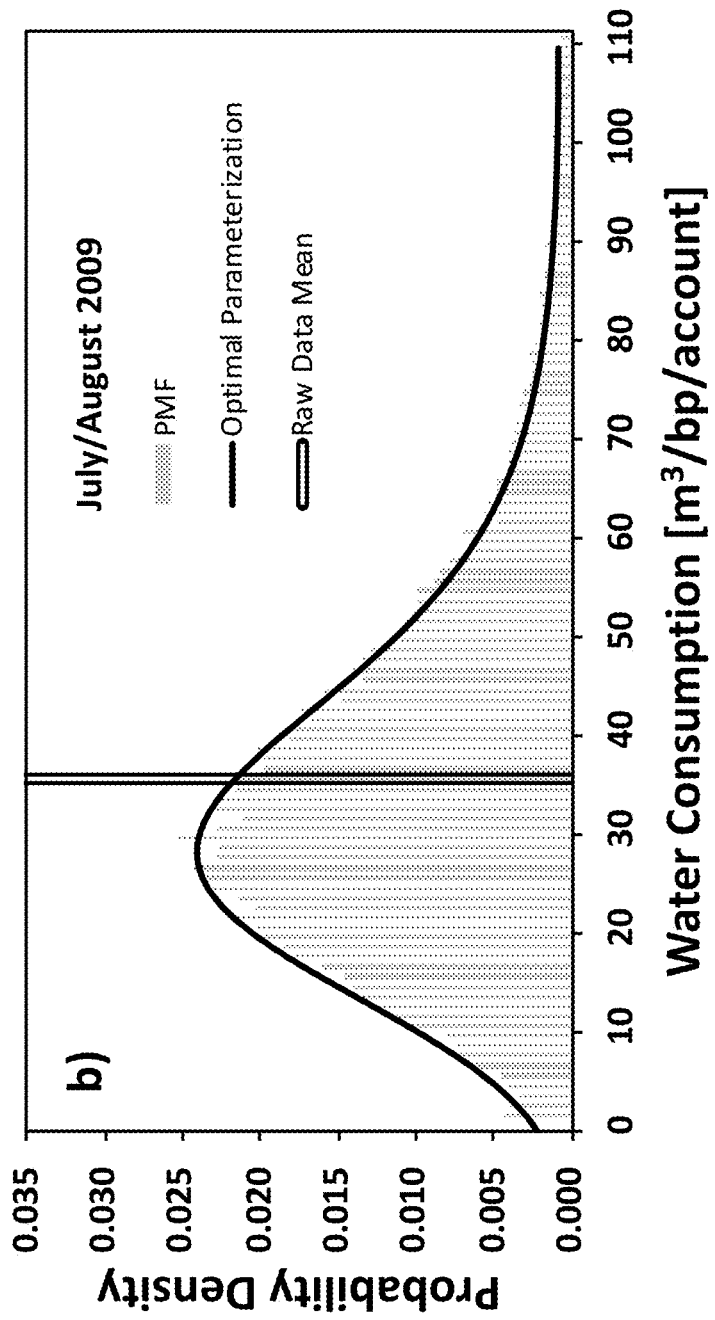
FIG. 21 is a chart illustrating a probability mass function for a water consumption example for the months of July/August 2009.
Figure 22:
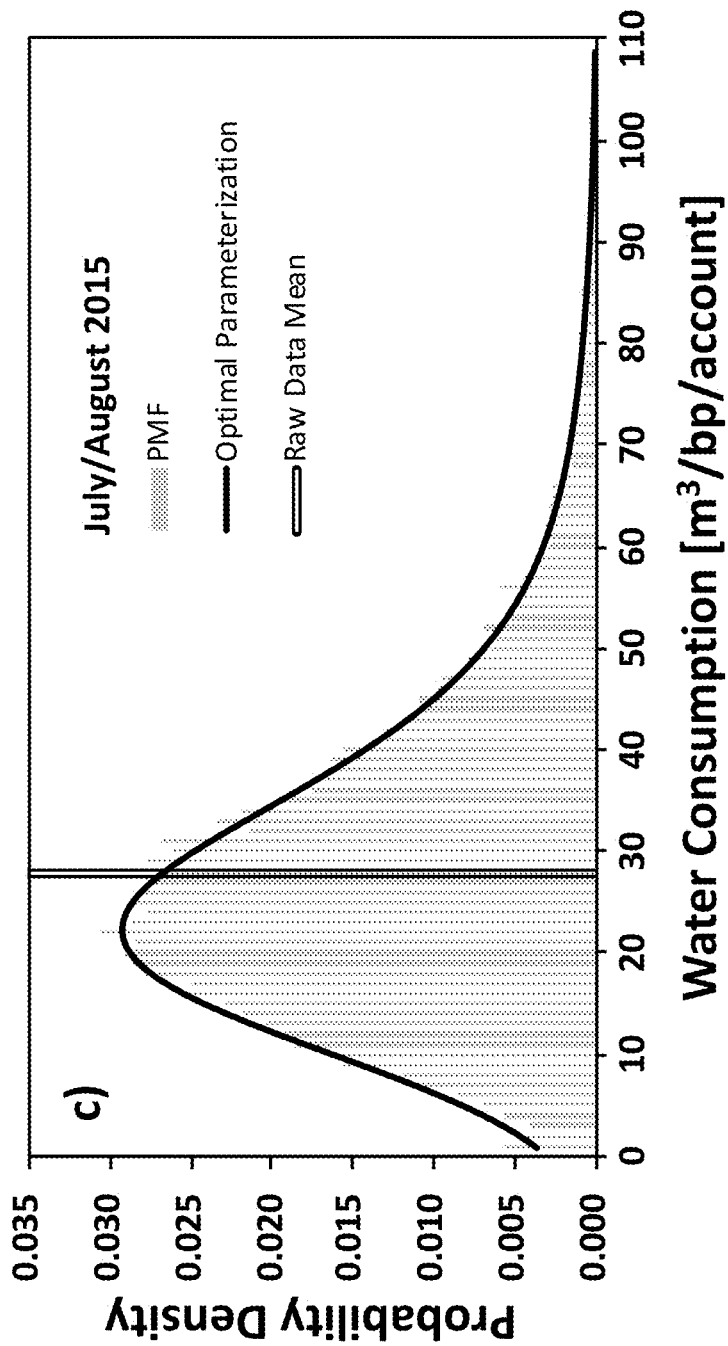
FIG. 22 is a chart illustrating a probability mass function for a water consumption example for the months of July/August 2015.
Figure 23:
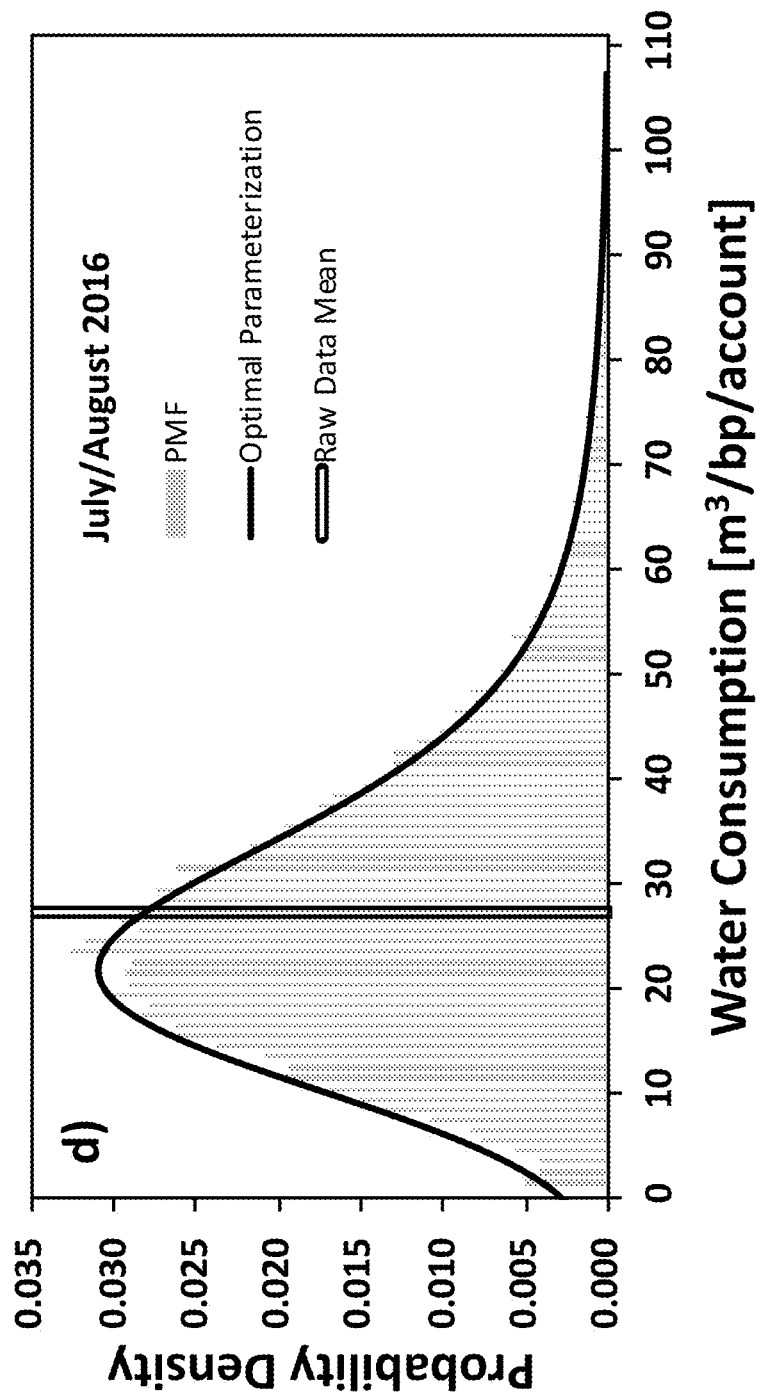
FIG. 23 is a chart illustrating a probability mass function for a water consumption example for the months of July/August 2016.

Modified-Fourier Series $\mathcal{F}_{0,2} = v_{0,1} \sin(\psi_{0,1} z + \ell_{0,1}) + v_{0,2} \sin(\psi_{0,2} z + \ell_{0,2})$ $\mathcal{F}_{1,2} = v_{1,1} \sin(\psi_{1,1} z + \ell_{1,1}) + v_{1,2} \sin(\psi_{1,2} z + \ell_{1,2})$ $g_z = -[\alpha_1 + \mathcal{F}_{0,2} + \tan(\frac{\alpha_2 \pi}{180})\{1 + \mathcal{F}_{1,2}\}z]$ FIGS. 14 and 15 illustrate the results of the experiment from the parameter estimation for all four input datasets. These figures depict the shape of the control function $g_z$ and resulting PDF $p_z$ in the standard score space. On FIG. 14, there is a noticeable difference between control functions that characterize unimodal and multi-modal distributions. Unimodal distributions express control functions that have a varying but negative slope across all z, but do not experience changes in concavity. In contrast, the modified-Fourier series control function for the Lenna dataset observes multiple changes in concavity, which roughly correspond to the peaks observed on the histogram in FIG. 7 and PDF in FIG. 15. Qualitatively, this suggests that there is an innate link between control function concavity and the modal characteristics of the associated PDF. Notably, the functions $g_z$ and $p_z$ for the water consumption, S&P 500 and hydraulic conductivity datasets are visually indistinguishable between the polynomial and Fourier series approaches given the low $MSE_{c,y}$ obtained when minimizing Equation (10) for both approaches. Control function parameters that result from minimizing Equation (10) for each input dataset are itemized on Tables 7 and 8.

TABLE 7

Control function parameterization for the water consumption, hydraulic conductivity, and S&P 500 datasets.

|  | Water Consumption | Hydraulic Conductivity | S&P 500 Index 08/21/2009 |
|---|---|---|---|
| CDF Bins | 16 | 16 | 16 |
| Polynomial Series Extension |  |  |  |
| $MSE_{\mu,y}$ | $6.77 \times 10^{-5}$ | $2.24 \times 10^{-5}$ | $1.02 \times 10^{-4}$ |
| $MSE_{c,y}$ | $8.08 \times 10^{-6}$ | $2.61 \times 10^{-5}$ | $1.04 \times 10^{-5}$ |
| $\alpha_0$ | −0.7344 | −0.8061 | −0.8950 |
| $\alpha_1$ | 0.3625 | 0.7014 | 0.3612 |
| $\alpha_2$ | 57.2188° | 50.7525° | 43.3229° |
| $\alpha_3$ | −0.8475 | −1.7144 | −0.6196 |
| $\alpha_4$ | 0.1249 | 0.5502 | 0.1653 |
| Modified-Fourier Series Extension |  |  |  |
| $MSE_{\mu,y}$ | $4.78 \times 10^{-6}$ | $3.40 \times 10^{-5}$ | $1.83 \times 10^{-4}$ |
| $MSE_{c,y}$ | $9.23 \times 10^{-5}$ | $3.12 \times 10^{-4}$ | $7.71 \times 10^{-5}$ |
| $\alpha_0$ | 1.2730 | 1.1166 | 1.1111 |
| $\alpha_1$ | 0.0584 | 0.0421 | 0.1048 |
| $\alpha_2$ | 26.3296° | 31.6049° | 29.1762° |
| $v_{0,1}$ | 0.9582 | 1.0539 | 0.4359 |
| $\psi_{0,1}$ | 1.6781 | 2.3394 | 1.7898 |
| $\ell_{0,1}$ | 0.0000 | 0.0000 | 0.0000 |

TABLE 8

Control function parameterization for the Lenna light intensity dataset.

| Control Function Parameter | Lenna Light Intensity |
|---|---|
| CDF Bins | 86 |
| $MSE_{\mu,y}$ | $1.77 \times 10^{-5}$ |
| $MSE_{c,y}$ | $8.91 \times 10^{-6}$ |
| $\alpha_0$ | −2.1826 |
| $\alpha_1$ | 0.4213 |
| $\alpha_2$ | 82.0695 |
| $v_{0,1}$ | 5.2015 |
| $\psi_{0,1}$ | 4.0151 |
| $\ell_{0,1}$ | 0.2116 |
| $v_{0,2}$ | −0.1827 |
| $\psi_{0,2}$ | 1.0838 |
| $\ell_{0,2}$ | −2.8071 |
| $v_{1,1}$ | −1.6093 |
| $\psi_{1,1}$ | 2.5347 |
| $\ell_{1,1}$ | −1.4543 |
| $v_{1,2}$ | −0.1561 |
| $\psi_{1,2}$ | 11.6571 |
| $\ell_{1,2}$ | −5.1059 |

FIGS. 16 to 19 illustrate direct comparisons between the discrete and continuous CDFs after achieving the minimum objective function in Equation (10) for the example experiments. Low $MSE_{C,y}$ values for each dataset suggest that the control function accurately replicates the shape of each dataset over the entire range of $0 \leq y \leq 4$. FIGS. 16 to 19 present a comparison of the CDF and CMF in the measurement space that is appropriate for each dataset. These parametric CDFs correspond to the parametric PDFs presented in FIGS. 8 to 11, respectively for each dataset.

Advantageously, the arithmetic mean of each dataset $\mu_{x,i}$ is similar to the probability-weighted mean of the parametric PDF $\mu_x$ as established by small values of $MSE_{\mu,y}$ (see Tables 7 and 8). The system 100 minimizing Equation (10) indirectly enforces the arithmetic mean of the discrete dataset to be nearly equal to the probability-weighted mean of the PDF for an appropriate control function. The S&P 500 application produces the largest observed error, $MSE_{\mu,y} = 1.83 \times 10^{-4}$ while applying the modified-Fourier series control function. Given that data in the median-relative space is dimensionless, this error is only $\sqrt{1.83 \times 10^{-4}}$ as a percentage of the median $m_{x,i}$. Additionally, and in reference to the exponential polynomial application of the water consumption distribution where $m_{x,i} = 40$ m³/account/period, the error of $6.77 \times 10^{-5}$ amounts to approximately 0.80% of the median water consumption. This translates into a total error of 7,027 m³/account/period during the July/August 2007 billing period for all 22,347-single-family residential accounts. Thus, the system's 100 use of the control function allows it to delineate many PDFs using the median and standard deviation statistics as defined by each dataset. Further, the mean statistic can be entirely defined by the median, standard deviation, and control function. The example experiments show the reproducibility of the system 100 through its ability to evaluate a wide variety of systems relevant to fields as disparate as economics, engineering, finance, and image analysis.

Given that the four datasets comprise hundreds to thousands of data points, the fact that the continuum-level information can be replicated with a few parameters in a continuously differentiable control function and PDF implies that the system 100 is able to undertake significant data compression. Table 5 itemizes the compression efficiency $\mathcal{C}$ for each set of parameters, with a minimum value of 98.37% for the S&P 500 dataset.

In some embodiments, probability, time-dependence and spatial reference information can be used to forecast how the evolution of the median, standard deviation, and control function predictably influence the mean statistic; predicated on the idea that a consistent set of control function parameters can relate causality between influential processes and the shape of the distribution. The system's 100 combination of probability, time-dependence, and ambient conditions provides the foundation for viewing both the PDF and its mean statistic, as expressed in Equation 12, as a technical solution to an advection-dispersion problem. This solution provides allows the advective-dispersive process to be viewed in the context of the statistical transformations in Table 1. The median represents the central tendency or bulk location of the distribution, while the standard deviation and standard-score PDF combine to characterize the scale and shape of the distribution. Therefore, advantageously, changes to the median, standard deviation, and standard-score PDF through the control function are commensurate to advection and dispersion. Thus, the system 100 can be used to observe a continuous shift in the distribution of empirical results through probabilistic advection and dispersion using the following relationship:

$$\underbrace{p_x}_{\substack{continuum \\ distribution}} = \underbrace{m_x}_{\substack{probabilistic \\ advective \\ process}} + \underbrace{\frac{1}{\sigma_x} \times p_z}_{\substack{probabilistic \\ despersive \\ process}} \quad (15)$$

This interpretation of advection and dispersion can provide an approach to deconstruct complex probabilistic processes into the simple concepts of location, scale, and shape. Thus allowing these statistics to be individually modelled and recombined to reproduce, model, and potentially forecast how these complex processes will evolve through time.

Three illustrative examples of the embodiments described herein are described below. However, it will be appreciated that various changes and modifications may be made without departing from the scope of the system and method, which is then defined by the claims.

In an example, the embodiments described herein may be used in the context of water demand forecasting. An input discrete dataset is received from a monitoring system used to track metered water demand at residential accounts for a water utility over time. These measurements are recorded and transmitted by monitoring devices to a centralized server where they are stored in a database. In this example, the distributed water demand data is aggregated and analyzed by a forecasting model to infer casual information relating how residential water demand responds to external influential processes; such as price and weather conditions. In this way, the model can transmit output to a water utility employee submitting a query to forecast future water demand, and hence revenue, under anticipated prices and weather conditions to ensure financial sustainability of the utility.

In this water demand example, residential water consumption data was collected from a sample utility over a 10-year period consisting of 60 bimonthly billing periods between January/February 2007 and November/December 2016 for a total of 1,549,371 observations and 51,291,348 m³ of cumulative billed water. In this case, the water utility applies a volume-constant pricing structure and services upwards of 27,000 residential accounts during each billing period.

FIGS. 20 to 23 illustrate charts showing residential water consumption histograms and their corresponding best fit PDFs from a July/August billing period. Also shown is the arithmetic mean of the data. FIGS. 20 to 23 illustrate optimal parameterization of a sample billing period during 2007, 2009, 2015, and 2016, respectively. The parameterization is shown superimposed onto its respective histogram to demonstrate the goodness of fit. To varying degrees, each water consumption histogram for each billing period is reproduced by PDFs that are asymmetric and shifted with a heavy tail. This results in a set of discrete median $m_{x,i}, t$, standard deviation $\sigma_{x,i}, t$, as well as control function parameters $\alpha_1, t$, $\alpha_2, t$, $\alpha_3, t$, and $\alpha_4, t$ for the water consumption histograms representing each bimonthly period $t$.

Figure 24:
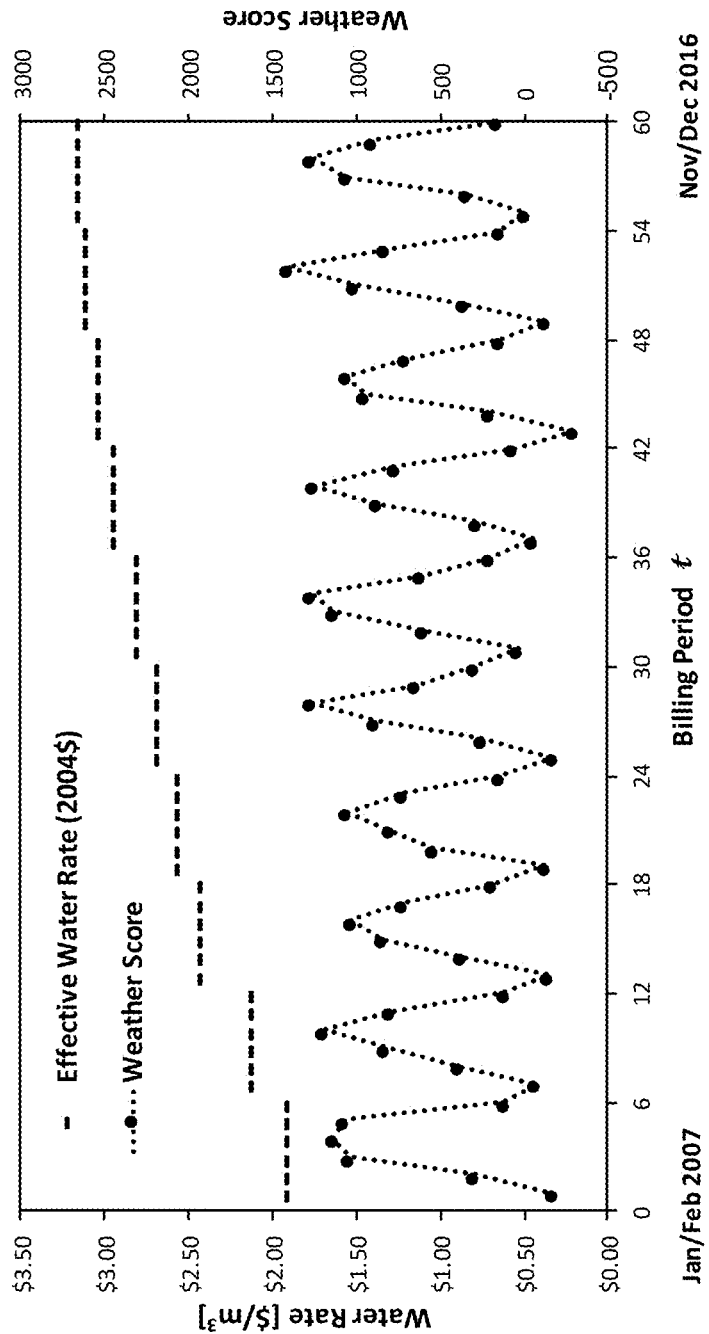
FIG. 24 is a chart illustrating discrete values for the example of FIGS. 20 to 23.
Figure 25:
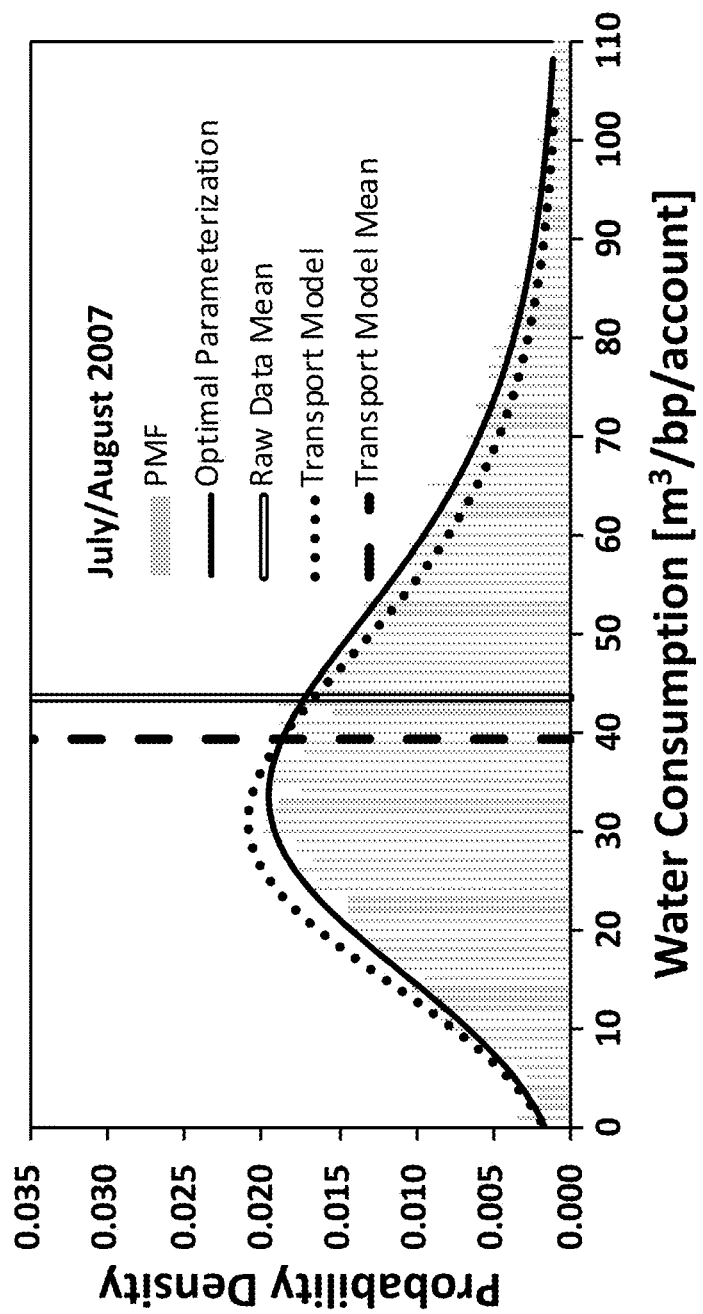
FIG. 25 is a chart illustrating a transport model comparison to the probability mass function of FIG. 20.
Figure 26:
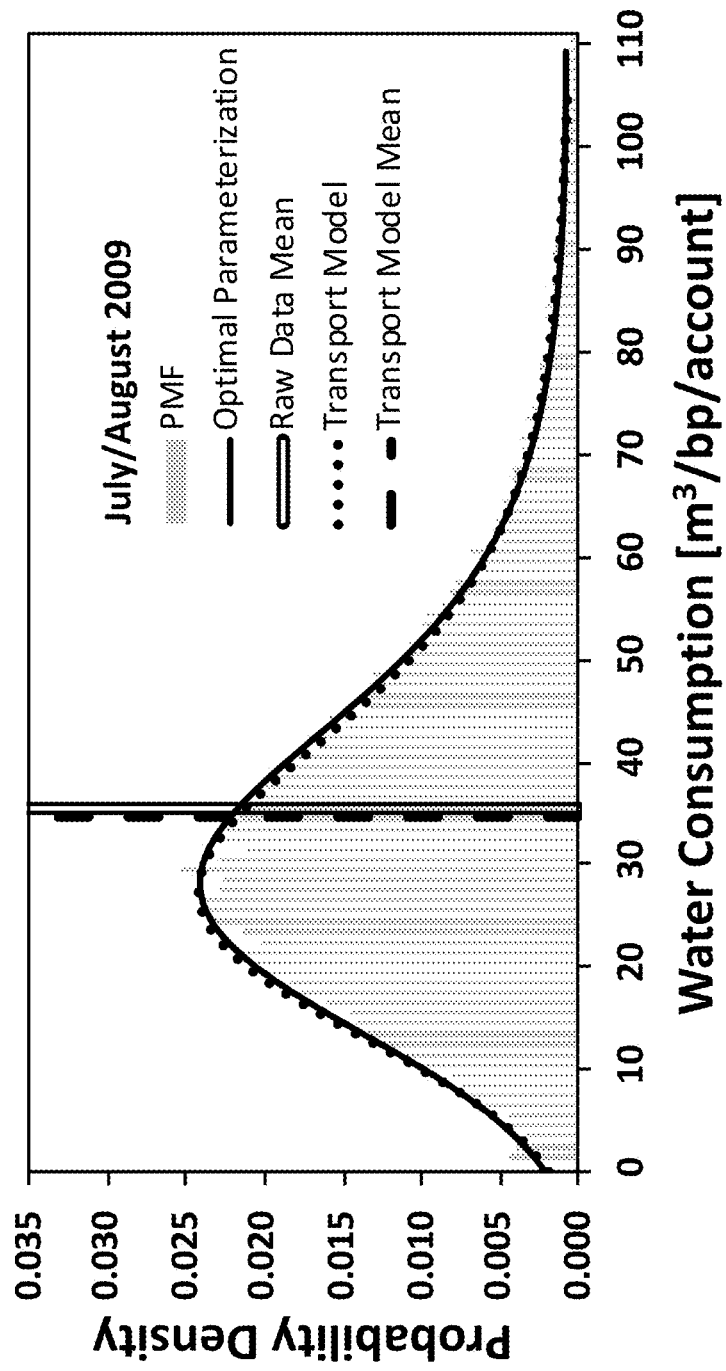
FIG. 26 is a chart illustrating a transport model comparison to the probability mass function of FIG. 21.
Figure 27:
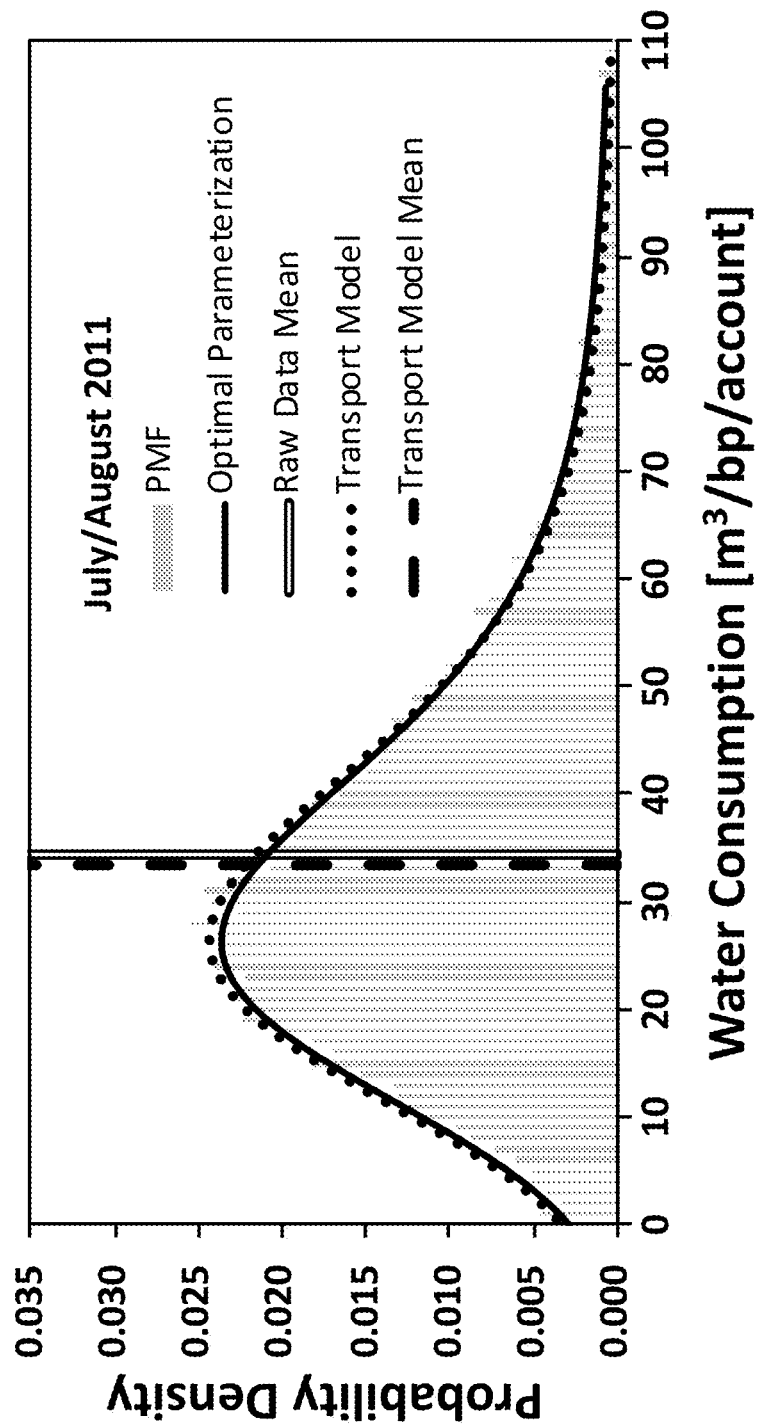
FIG. 27 is a chart illustrating a transport model comparison to the probability mass function of FIG. 22.
Figure 28:
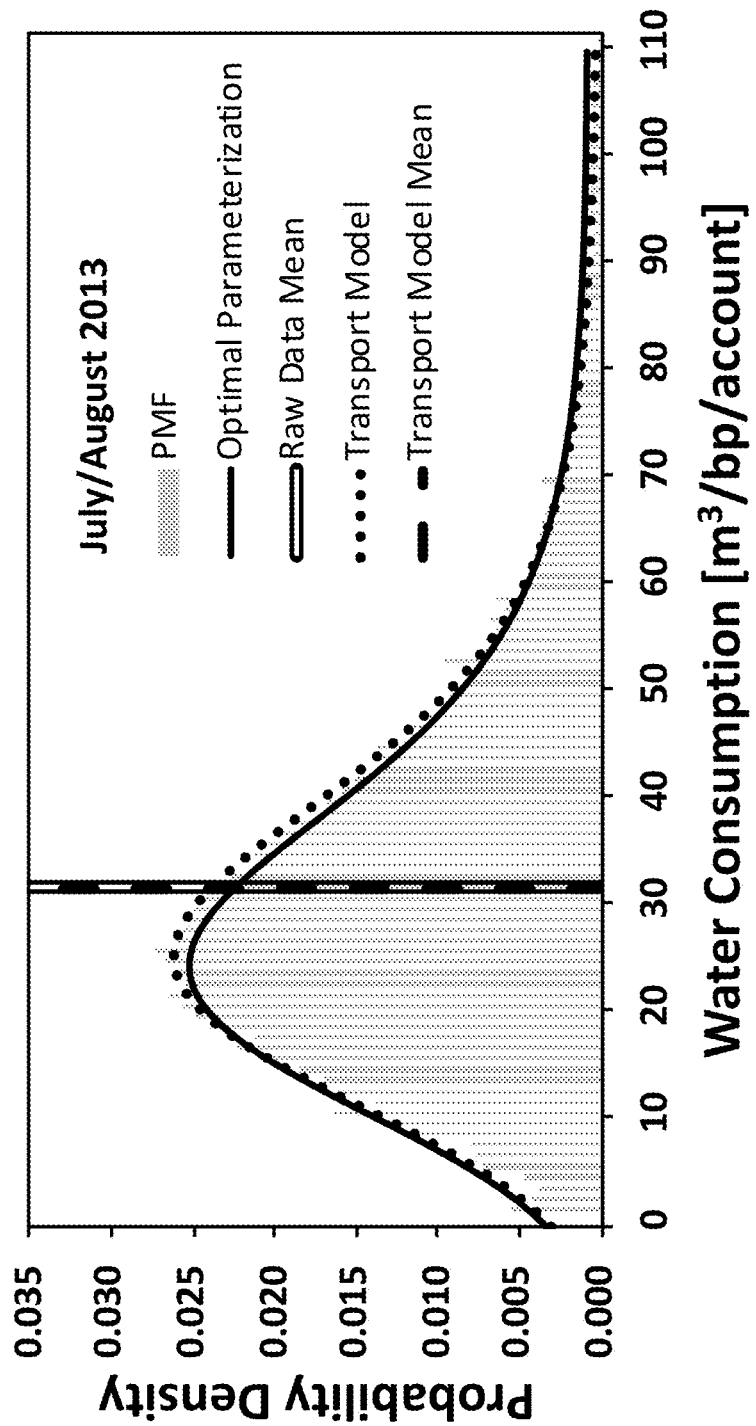
FIG. 28 is a chart illustrating a transport model comparison to the probability mass function of FIG. 23.

FIG. 24 illustrates discrete values for an external influential process represented by the weather score W. (as a product of temperature and precipitation) and real water price P, for the billing periods between January/February 2007 and November/December 2016.

In general, the water utility annually increases real water price to boost revenues, while the weather score changes periodically due to seasonal variability in temperature and precipitation. Generally, the troughs that appear along the weather score visualization represent the winter months, whereas the peaks represent summer months. Variability in the amplitude and width of the peaks are likely a consequence of seasonal weather variability that may include extreme weather events such as heavy rainfall in March/April and May/June or drought conditions in July/August and September/October billing periods.

The utility of the statistics $m_{x,i}, t$, $\sigma_{x,i}, t$, $\alpha_2, t$, $\alpha_3, t$, and $\alpha_4, t$ derived from the fitting the histogram data is their ability to be correlated to casual influences by a machine learning model, which in this case are weather score W $t$ and real water price P$t$ observed over each period $t$.

FIGS. 25 to 28 illustrate charts of residential water consumption histograms and corresponding PDFs generated by the system 100 for a sequence of July/August billing periods (2007, 2009, 2011, and 2013, respectively), with $p_x$, $t$ forecasted from optimally fitting the data, and $p_x(P,W,t)$ obtained using curvilinear regression models. Also shown is the discrete mean $\mu_{x,i}, t$ as well as $\mu_x(P,W,t)$. FIGS. 25 to 28 show histogram data combined with a superimposed representation of the optimal PDF $p_x, t$ obtained by the system 100 using the set of control function parameters $\alpha_1, t$, $\alpha_2, t$, $\alpha_3, t$, and $\alpha_4, t$ fit to each histogram. It also shows the derived PDF resulting from advective-dispersive transport $p_x(P,W,t)$ for the curvilinear regression models. It also shows the arithmetic mean of the raw data $\mu_{x,i}, t$ as well as the model estimate $\mu_x(P,W,t)$.

Advantageously, in this example, the embodiments described herein can be used by the water utility operators to generate a single time-continuous set of compressed data recording the location, scale and shape of the distribution of residential water demand; which can be monitored and attributed to the current price and weather conditions. This approach is amenable to machine learning techniques that can be trained to replicate consumers' response to price signals and further aid the utility in price setting to ensure financial sustainability. The shape of the PDF can be used by the water utility to accurately determine the impact of price setting on low water demand users are potentially subject to financial hardship. Additionally, the probability of water demand within the high usage tail of the distribution can be used by water treatment managers to ensure adequate water supply for all residential water accounts holders under peak demand conditions.

In an example, the embodiments described herein may be used in the context of drug efficacy forecasting from a biometric input dataset. The discrete input dataset can include data from a monitoring system used to track physical and biochemical attributes of a population of patients over time. These attributes can be recorded and transmitted by monitoring devices to a centralized server where they are communicated to a database. The system 100 can use a machine learning model to aggregate this distributed input dataset and further analyze the data to infer casual information relating how patients both collectively and individually respond to pharmaceutical dosing through temporal changes in their physical and biochemical attributes. The system 100 can then output the forecast to a physician or health care professional, for example.

Figure 29:
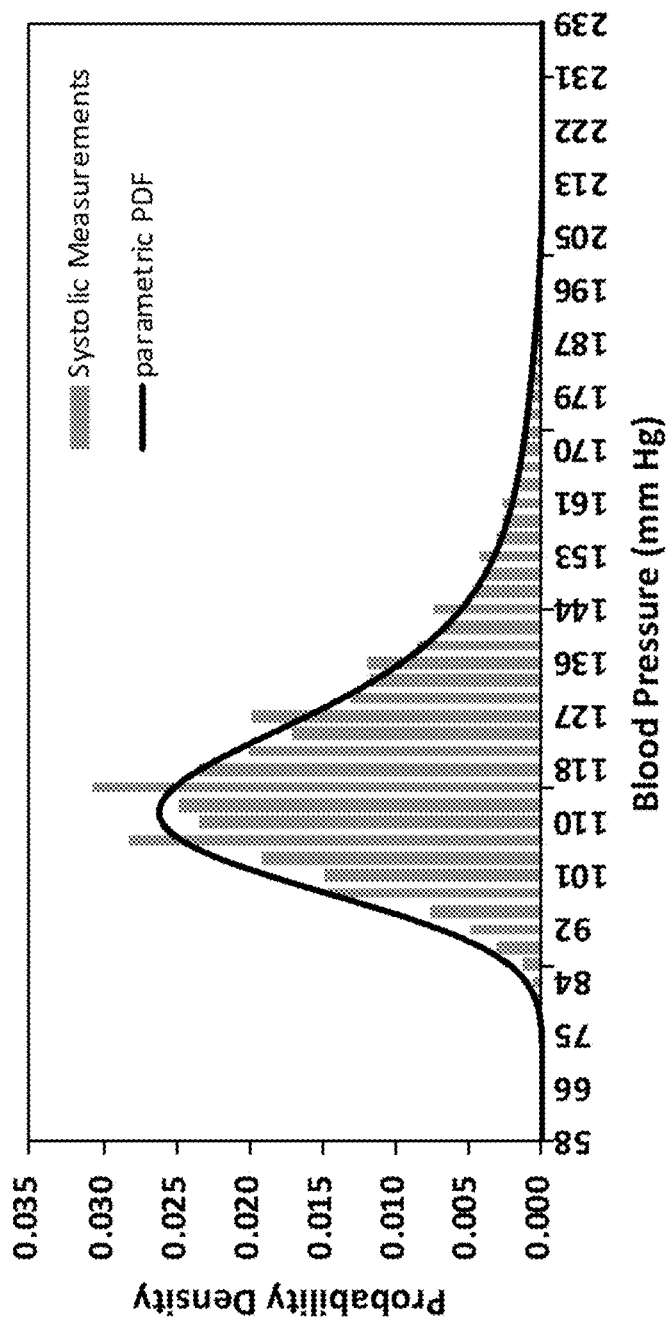
FIG. 29 is a chart illustrating a histogram and probability density function for systolic measurements according to an example.
Figure 30:
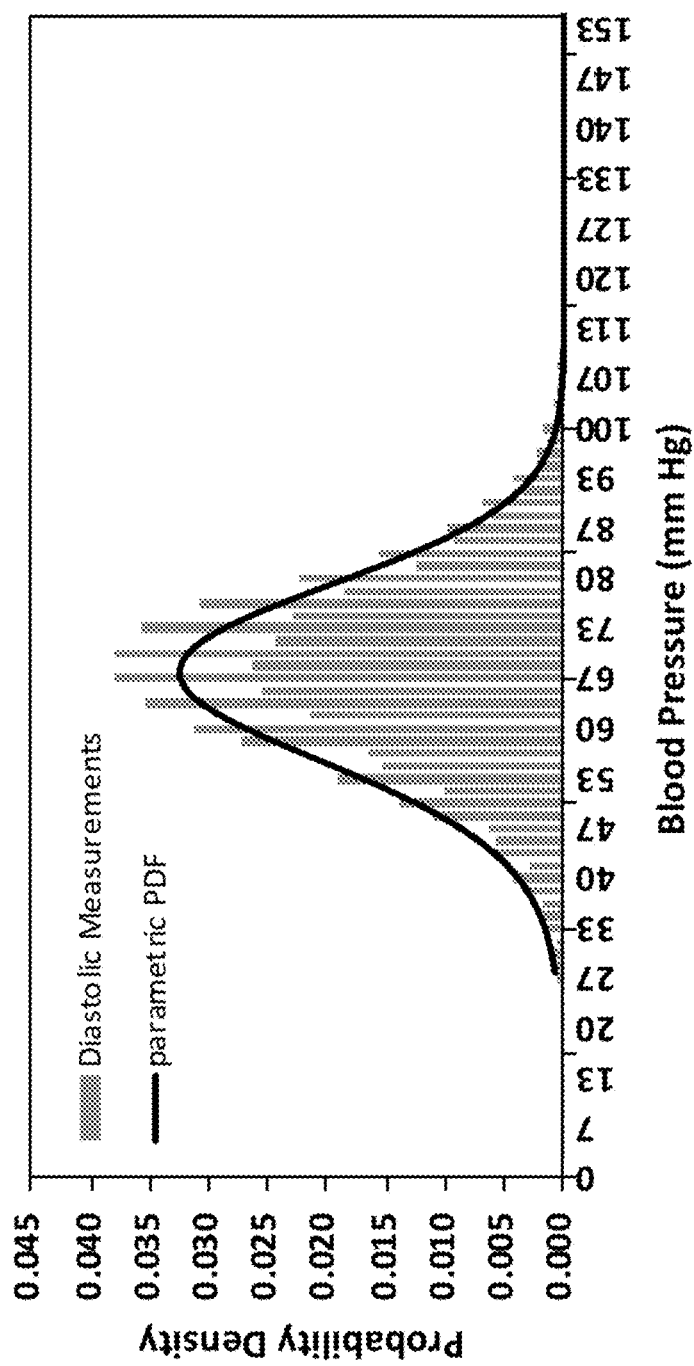
FIG. 30 is a chart illustrating a histogram and probability density function for diastolic measurements according to the example of FIG. 29.
Figure 31:
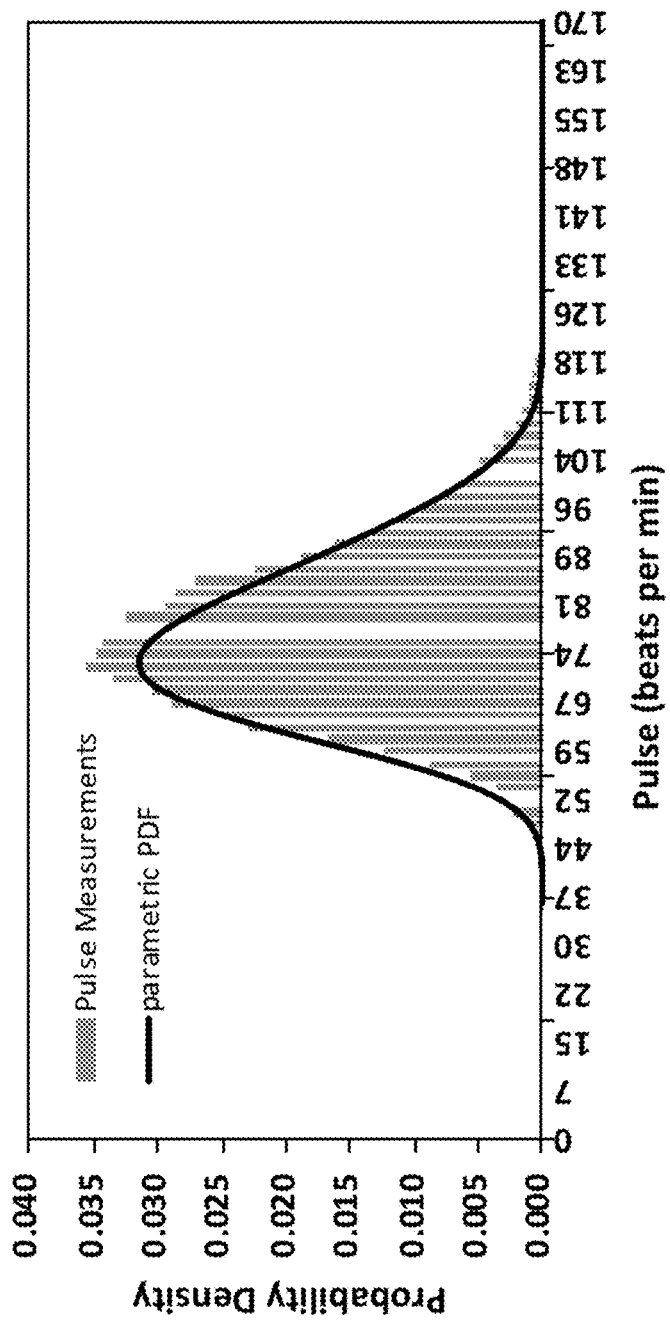
FIG. 31 is a chart illustrating a histogram and probability density function for pulse rate measurements according to the example of FIG. 29.
Figure 32:
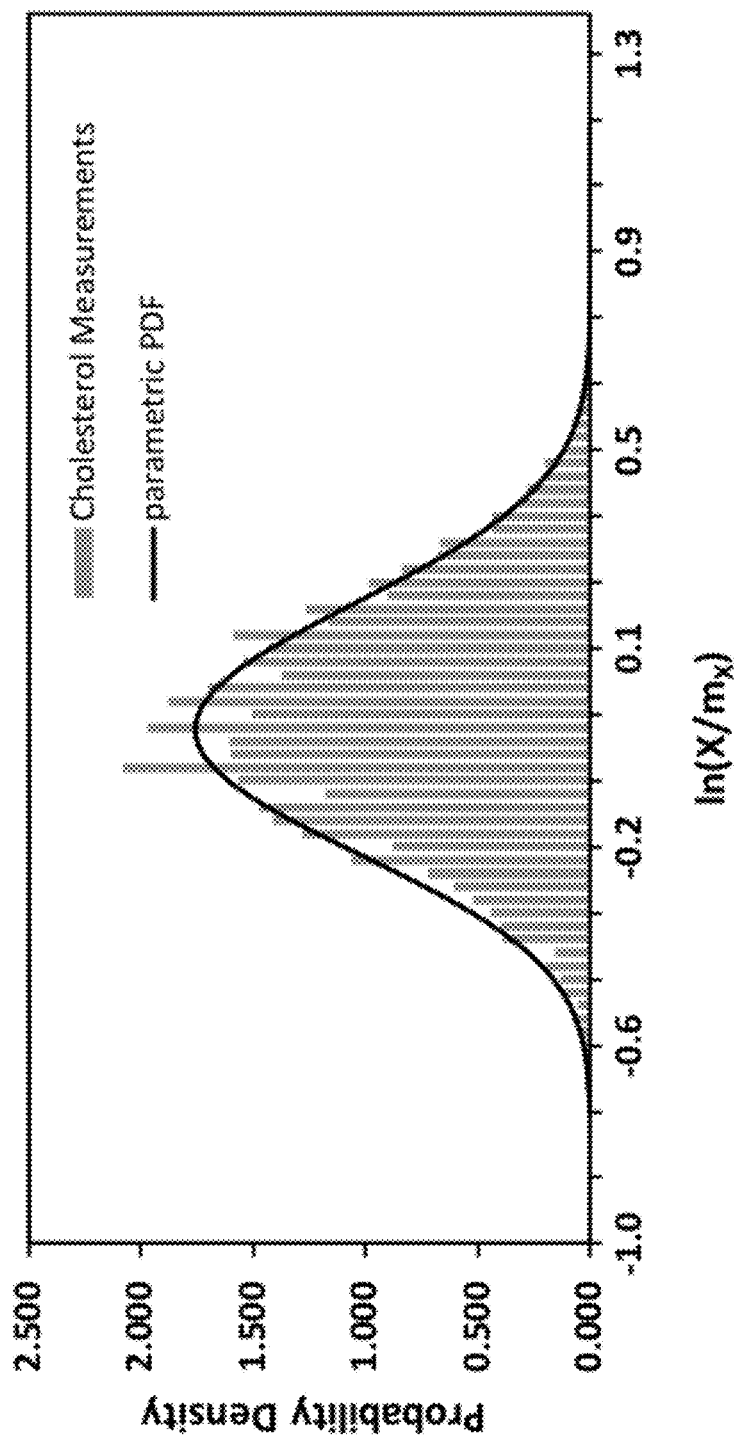
FIG. 32 is a chart illustrating a histogram and probability density function for cholesterol measurements according to an example.
Figure 33:
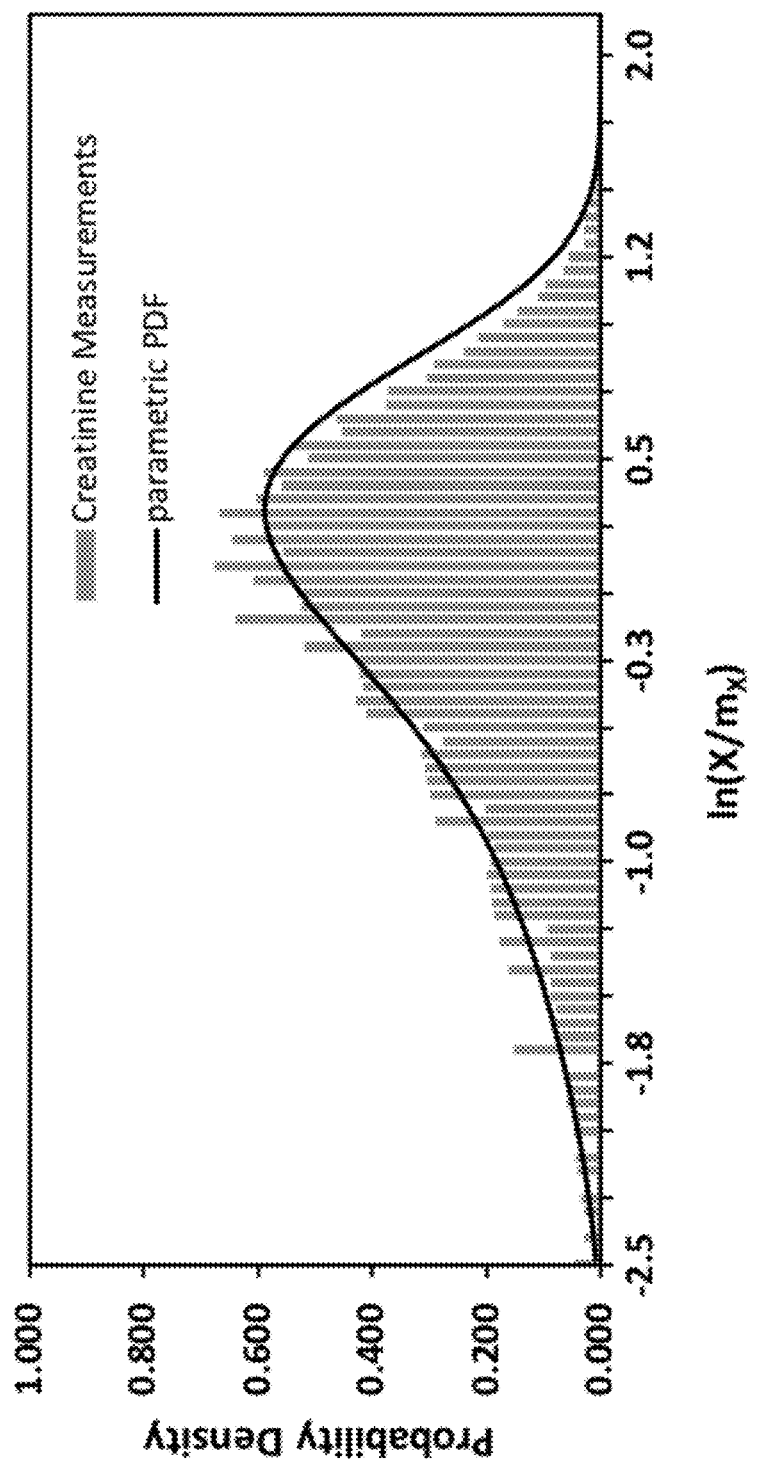
FIG. 33 is a chart illustrating a histogram and probability density function for creatinine measurements according to the example of FIG. 32.

This example can use large datasets that itemize the physical and biochemical status of healthcare study participants. Typically, these studies rely heavily upon the normal distribution when interpreting these results to determine attributes such as probability of occurrence as well as significant differences between populations. Moreover, typically, these studies use these statistics to infer causal relationships to changes in the location, scale and shape of the distributions with external influences such as; age, weight, gender, pre-existing conditions, exercise, diet, geographic location, and pharmaceutical dosing, among others. Baseline studies provide a foundation for determining the influence of external influences in changing physical and biochemical measures. Example studies include those conducted by the National Center for Health Statistics (Centers for Disease Control and Protection) which may include physical measures such as blood pressure and heart rate or biochemical measures such as creatinine production or cholesterol levels, among many others. The relative frequency of each measurement within a dataset reflects important information about the population being studied. For example, FIGS. 29 to 31 are charts illustrating systolic, diastolic, and pulse rate, respectively, representing 66,315 measurements of each type. FIGS. 32 and 33 are charts illustrating total blood cholesterol and creatinine, respectively; representing 67,946 and 71,806 measurements, respectively. Both of these physical and biochemical datasets indicate that the baseline populations do not conform to normal distributions. Instead, these distributions are asymmetric, shifted, and with a heavy tail.

Using the present embodiments, the input data shown in FIGS. 29 to 33 can be fit with parametric PDFs as determined by the system 100. Advantageously, this can provide substantial data compression as well as a continuous function to determine the influence of external influences (causality) on changes in the location, scale and shape of the distribution. FIGS. 29 and 30 show blood pressure observations and FIG. 31 shows pulse rate observations recorded by the National Center for Health Statistics from 1999 to 2016, where blood pressure is the arithmetic mean of all successful measurements on a single individual. Pharmaceutical dosing of blood pressure medication on a test group extracted from the population shown in FIGS. 29 to 31 may reduce the instances of high-blood pressure measurements, thus changing the location, scale, and shape of the distribution defining the test group relative to its initial overlap with the baseline distribution. Generally, the purpose of a medication is to reduce the occurrence of high-blood pressure measurements, thus causing a shift in the location, scale, and shape of the blood pressure distributions. If high blood pressure is a negative attribute, then using the present embodiments may help quantify the impact of medication on individuals that regularly preside in the high magnitude blood pressure and low frequency tail. An example advantage of the present embodiments is that in generating parametric PDFs, such that they can accurately measure the probability that a patient will occupy low-frequency regions. Furthermore, a single time-continuous set of parameters defining the location, scale and shape of the distribution can be correlated to attributes of the dose thereby inferring a causal relationship of how a test group responds to a prescription.

Advantageously, in this example, the embodiments described herein can be used by physicians and health care professionals because the system 100 provides a compressed data set of location, scale and shape information of the distribution of patient responses; which can be monitored and attributed to a prescription-based dosage of pharmaceutical drugs. Moreover, the system 100 can use trained machine learning models to replicate physicians' responses to the output analysis and further infer casual relationships between patients and their response to their assigned drug dosage.

In another example, the embodiments described herein may be used in the context of predicting coronary heart disease risk. In this example, an input dataset comprising a ten-year coronary heart disease (CHD) risk for a set of 4081 patients were classified in the Framingham series of studies in a binary outcome as being either "at risk" or "not at risk". Patient biometric records also included physical and biochemical attributes such as; age, systolic and diastolic blood pressure, heart rate, body mass index, total cholesterol, and blood glucose. In this example, the system 100 fits histograms of the data representing the physical and biochemical attributes using a generated parametric PDF, and then can use these PDFs in a trained Naïve Bayes machine learning model classifier. The objective of the Naïve Bayes technique is to determine whether a given patient should be classified as being "at risk" or "not at risk" of CHD subject to their biometric measurements.

In this example, the system 100 took the first 3000 patient records to train the Naïve Bayes algorithm, and then the remaining 1081 for testing the machine learning model. For comparison, two variations of the Naïve Bayes technique were employed. First, conventional normal distributions were used to reproduce age, systolic and diastolic blood pressure, heart rate, body mass index histograms and log-normal distributions in order to reproduce total cholesterol and blood glucose histograms. Second, parametric PDFs of the present embodiments were employed to reproduce age, systolic and diastolic blood pressure, heart rate, body mass index, total cholesterol and blood glucose histograms. The present inventors' testing indicated that the first approach which utilized the normal distribution misclassified patients that were indicated in the study as having CHD risk with an error of 23.48%. These misclassifications represent false negatives; that is, the algorithm predicted they were not at risk of having CHD risk whereas the study indicated that they were. The second approach, using the present embodiments, reduced the misclassification of false negatives to 18.79%.

This example illustrates the virtue of accurately compressing the biometric input data within the histogram into a continuous parametric PDF, as in the present embodiments; such that, when determining probabilities from the Naïve Bayes machine learning approach, prediction accuracy can be improved. In combination with the previous example, the Naïve Bayes machine learning model can also be used to obtain a single time-continuous set of parameters defining the location, scale and shape of each distribution used within the Naïve Bayes approach; where these parameters can be correlated to attributes of a pharmaceutical dose. For example, common blood pressure medications may reduce a patients systolic and diastolic blood pressure thereby influencing their CHD risk. Quantifying the transient response in how a patient group responds to a pharmaceutical dose would allow the machine learning model to predict the reduction in CHD risk of specific individual at a future date subject to their current biometric measurements.

Although the invention has been described with reference to certain specific embodiments, various modifications thereof will be apparent to those skilled in the art without departing from the spirit and scope of the invention as outlined in the claims appended hereto.

The invention claimed is:

1. A method of executing efficient parametric data compression pre-processing on a discrete dataset as input for a machine learning model, the discrete dataset comprises a plurality of discrete measurements to be analyzed by the machine learning model, the method executable on one or more computer processors, the method comprising:
receiving the input discrete dataset;
determining a median and a standard deviation of the input discrete dataset;
generating a probability mass function comprising a probability of finding a particular data point in the input discrete dataset within a particular bin of a histogram representative of the input discrete dataset;
transforming the probability mass function into a continuously differentiable probability density function using the standard deviation, the probability density function determined using a parametric control function, the parametric control function comprising a lognormal derivative of the probability density function, the parameters within the control function are estimated using optimization that minimizes a mean-squared error of an objective function; and
outputting the probability density function, representing compression of the input discrete dataset, into the machine learning model for analysis.

2. The method of claim 1, further comprising discarding any data point greater than a predetermined culling threshold.

3. The method of claim 1, wherein the input discrete dataset comprising a unimodal distribution and the parametric control function comprising a linear function.

4. The method of claim 3, wherein the parametric control function further comprising at least one of polynomial terms and Fourier terms.

5. The method of claim 1, wherein the input discrete dataset comprising a multi-modal distribution and the parametric control function comprising a parameterized modified Fourier series.

6. The method of claim 1, further comprising:
transforming the input discrete dataset into a median relative space;
determining a cumulative mass function as a summation over bins of the probability mass function;
mapping the cumulative mass function to the median relative space;
determining a cumulative distribution function as an integration of the probability density function; and
mapping the cumulative distribution function into the median-relative space, wherein the minimizing mean-squared error of the objective function comprising minimizing the difference between the cumulative distribution function and the cumulative mass function in the median-relative space.

7. The method of claim 6, wherein the transforming of the input discrete dataset into the median relative space comprising a linear transformation.

8. The method of claim 6, wherein the transforming of the input discrete dataset into the median relative space comprising a lognormal transformation.

9. The method of claim 6, further comprising determining a goodness of fit of the parametric probability density function comprising minimizing a mean-squared error between an arithmetic mean of the input discrete dataset in the median-relative space and a mean of the probability density function in the median-relative space.

10. The method of claim 6, further comprising adding additional polynomial terms to the objective function incrementally until the mean-squared error between the cumulative distribution function and the cumulative mass function in the median-relative space is minimized.

11. A system of executing efficient parametric data compression pre-processing on a discrete dataset as input for a machine learning model, the discrete dataset comprises a plurality of discrete measurements to be analyzed by the machine learning model, the system comprising one or more processors and one or more non-transitory computer storage media, the one or more non-transitory computer storage media causing the one or more processors to execute:
an input module to receive the input discrete dataset;
a compression module to:
determine a median and a standard deviation of the input discrete dataset;
determine a probability mass function comprising a probability of finding a particular data point in the input discrete dataset within a particular bin of a histogram representative of the input discrete dataset; and
transform the probability mass function into a continuously differentiable probability density function using the standard deviation, the probability density function determined using a parametric control function, transforming the probability mass function into a continuously differentiable probability density function using the standard deviation, the probability density function determined using a parametric control function, the parametric control function comprising a lognormal derivative of the probability density function, the parameters within the control function are estimated using optimization that minimizes a mean-squared error of an objective function, the parameters within the control function are estimated using optimization that minimizes a mean-squared error; and
an output module to output the probability density function, representing compression of the input discrete dataset, for use an input into the machine learning model for analysis.

12. The system of claim 11, the compression module further discarding any data point greater than a predetermined culling threshold.

13. The system of claim 11, wherein the input discrete dataset comprising a unimodal distribution and the parametric control function comprising a linear function.

14. The system of claim 13, wherein the parametric control function further comprising at least one of polynomial terms and Fourier terms.

15. The system of claim 11, wherein the input discrete dataset comprising a multi-modal distribution and the parametric control function comprising a parameterized modified Fourier series.

16. The system of claim 11, the compression module further:
- transforming the input discrete dataset into a median relative space;
- determining a cumulative mass function as a summation over bins of the probability mass function;
- mapping the cumulative mass function to the median relative space;
- determining a cumulative distribution function as an integration of the probability density function; and
- mapping the cumulative distribution function into the median-relative space, wherein minimizing the mean-squared error of the objective function comprising minimizing the difference between the cumulative distribution function and the cumulative mass function in the median-relative space.

17. The system of claim 16, wherein the transforming of the input discrete dataset into the median relative space comprising a linear transformation.

18. The system of claim 16, wherein the transforming of the input discrete dataset into the median relative space comprising a lognormal transformation.

19. The system of claim 16, the compression module further determining a goodness of fit of the parametric probability density function comprising minimizing a mean-squared error between an arithmetic mean of the input discrete dataset in the median-relative space and a mean of the probability density function in the median-relative space.

20. The system of claim 16, the compression module further adding additional polynomial terms to the objective function incrementally until the mean-squared error between the cumulative distribution function and the cumulative mass function in the median-relative space is minimized.

* * * * *